US012626432B2

(12) United States Patent
Choi et al.

(10) Patent No.: US 12,626,432 B2
(45) Date of Patent: May 12, 2026

(54) ELECTRONIC DEVICE AND METHOD FOR PROVIDING AUGMENTED REALITY CONTENT

(71) Applicant: Samsung Electronics Co., Ltd.,
Suwon-si (KR)

(72) Inventors: Yoonjung Choi, Suwon-si (KR);
Jiyoung Kang, Suwon-si (KR);
Younghak Oh, Suwon-si (KR);
Jaehyun Han, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 272 days.

(21) Appl. No.: 18/306,634

(22) Filed: Apr. 25, 2023

(65) Prior Publication Data

US 2023/0260177 A1      Aug. 17, 2023

Related U.S. Application Data

(63) Continuation      of      application      No.
PCT/KR2021/019060, filed on Dec. 15, 2021.

(30) Foreign Application Priority Data

Dec. 18, 2020      (KR) ......................... 10-2020-0178885

(51) Int. Cl.
  *G06F 3/041*      (2006.01)
  *G06F 3/01*      (2006.01)
    (Continued)
(52) U.S. Cl.
  CPC .............. *G06T 11/60* (2013.01); *G06F 3/011*
    (2013.01); *G06F 3/03545* (2013.01);
    (Continued)

(58) Field of Classification Search
  CPC ....... G06T 11/60; G06T 11/001; G06T 13/00;
    G06T 2200/24; G06T 13/80;
    (Continued)

(56) References Cited

U.S. PATENT DOCUMENTS 9,313,451 B2     4/2016   Kim et al.
9,445,043 B2     9/2016   Turbell
      (Continued)

FOREIGN PATENT DOCUMENTS

CN        110536094 A       12/2019
JP     2019-121362 A        7/2019
      (Continued)

OTHER PUBLICATIONS

International Search Report dated Mar. 23, 2022, issued in International Patent Application No. PCT/KR2021/019060.
      (Continued)

*Primary Examiner* — Temesghen Ghebretinsae
*Assistant Examiner* — Sosina Abebe

(57)      ABSTRACT

An electronic device is provided. The electronic device includes a camera, a touch panel, a display, a communication circuit, at least one processor operatively connected with the camera, the touch panel, the display, and the communication circuit, and a memory operatively connected with the at least one processor The memory stores one or more instructions, when executed, causing the at least one processor to display a first image captured by the camera and a second image received from an external electronic device through the communication circuit on the display, display first augmented reality content on the first image, display second augmented reality content on the second image, and display an animation effect of the first augmented reality content using the second augmented reality content based on a user input through the touch panel.

20 Claims, 14 Drawing Sheets

(51) Int. Cl.

| | |
|---|---|
| *G06F 3/0354* | (2013.01) |
| *G06F 3/04883* | (2022.01) |
| *G06T 11/00* | (2006.01) |
| *G06T 11/60* | (2006.01) |
| *G06T 13/00* | (2011.01) |
| *G06V 20/20* | (2022.01) |
| *G06V 40/10* | (2022.01) |
| *H04N 5/262* | (2006.01) |
| *H04N 23/63* | (2023.01) |

(52) U.S. Cl.
CPC ........ *G06F 3/04883* (2013.01); *G06T 11/001* (2013.01); *G06T 13/00* (2013.01); *G06V 20/20* (2022.01); *G06V 40/10* (2022.01); *H04N 5/2628* (2013.01); *H04N 23/632* (2023.01); *G06F 2203/04803* (2013.01); *G06T 2200/24* (2013.01)

(58) Field of Classification Search
CPC .... G06T 19/006; G06F 3/011; G06F 3/03545; G06F 3/04883; G06F 2203/04803; G06F 3/0484; G06F 3/0488; G06F 3/04845; G06F 3/0481; G06V 20/20; G06V 40/10; H04N 5/2628; H04N 23/632
See application file for complete search history.

(56) References Cited

U.S. PATENT DOCUMENTS

| | | | |
|---|---|---|---|
| 10,057,305 | B2 | 8/2018 | Woolsey et al. |
| 10,559,111 | B2 | 2/2020 | Sachs et al. |
| 10,643,664 | B1 | 5/2020 | Taine et al. |
| 10,937,240 | B2 | 3/2021 | Anderson |
| 10,950,275 | B2 | 3/2021 | Taine et al. |
| 10,977,873 | B2 | 4/2021 | Lee et al. |
| 11,081,142 | B2 | 8/2021 | Taine et al. |
| 11,169,686 | B2 | 11/2021 | Kim et al. |
| 11,450,050 | B2 | 9/2022 | Berger et al. |
| 11,465,044 | B2 | 10/2022 | Kim et al. |
| 11,867,904 | B2 * | 1/2024 | Choi .................... G06V 10/945 |
| 2014/0380186 | A1 * | 12/2014 | Kim ...................... G06F 1/1677 715/746 |
| 2016/0127682 | A1 * | 5/2016 | Turbell ................ G11B 27/031 348/14.03 |
| 2020/0074705 | A1 * | 3/2020 | Berger ................... G06V 20/10 |
| 2021/0192858 | A1 | 6/2021 | Lee et al. |
| 2022/0343574 | A1 | 10/2022 | Berger et al. |

FOREIGN PATENT DOCUMENTS

| | | | | |
|---|---|---|---|---|
| JP | 6553212 | B2 | | 7/2019 |
| KR | 10-2012-0120858 | A | | 11/2012 |
| KR | 20120120858 | A | * | 11/2012 |
| KR | 10-2013-0010590 | A | | 1/2013 |
| KR | 20130010590 | A | * | 1/2013 |
| KR | 10-2013-0101823 | A | | 9/2013 |
| KR | 10-2014-0089146 | A | | 7/2014 |
| KR | 10-2014-0147497 | A | | 12/2014 |
| KR | 10-2016-0086560 | A | | 7/2016 |
| KR | 10-2017-0078785 | A | | 7/2017 |
| KR | 10-2017-0112406 | A | | 10/2017 |
| KR | 10-1961241 | B1 | | 3/2019 |
| KR | 10-1970352 | B1 | | 4/2019 |
| KR | 10-2142262 | B1 | | 8/2020 |
| KR | 10-2145748 | B1 | | 8/2020 |
| KR | 10-2364275 | B1 | | 2/2022 |

OTHER PUBLICATIONS

Korean Office Action dated Sep. 1, 2025, issued in a Korean Patent Application No. 10-2020-0178885.

* cited by examiner

500

IDENTIFY BODY PART OF FIRST USER WHERE FIRST AUGMENTED
REALITY CONTENT IS DISPLAYED FROM FIRST IMAGE ~501

IDENTIFY BODY PART OF SECOND USER, WHICH CORRESPONDS
TO BODY PART OF FIRST USER, FROM SECOND IMAGE ~503

DISPLAY FIRST AUGMENTED REALITY
CONTENT ON BODY PART OF SECOND USER ~505

800

DISPLAY THIRD IMAGE, FOURTH IMAGE, AND FIFTH IMAGE ON DISPLAY — 801

DISPLAY THIRD AUGMENTED REALITY CONTENT ON THIRD IMAGE — 803

DISPLAY FOURTH AUGMENTED REALITY CONTENT ON FOURTH IMAGE — 805

DISPLAY THIRD AUGMENTED REALITY CONTENT AND
FOURTH AUGMENTED REALITY CONTENT ON FIFTH IMAGE — 807

STORE FIFTH IMAGE — 809

ELECTRONIC DEVICE AND METHOD FOR PROVIDING AUGMENTED REALITY CONTENT

CROSS-REFERENCE TO RELATED APPLICATION(S)

This application is a continuation application, claiming priority under § 365(c), of an International application No. PCT/KR2021/019060, filed on Dec. 15, 2021, which is based on and claims the benefit of a Korean patent application number 10-2020-0178885, filed on Dec. 18, 2020, in the Korean Intellectual Property Office, the disclosure of which is incorporated by reference herein in its entirety.

BACKGROUND

1. Field

The disclosure relates to an electronic device and a method for providing augmented reality content.

2. Description of Related Art

Augmented reality is a technology of synthesizing and showing virtual things or information with a real environment. Virtual reality for replacing a real world provides a user with a sense of immersion for a virtual environment, whereas augmented reality for complementing the real world by overlapping a virtual object with the real world may provide the user with a sense of presence for the virtual object.

As an augmented reality technology is loaded into a portable electronic device, the electronic device may synthesize a virtual object with an image obtained by its camera to provide augmented reality content.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect the disclosure is to provide an electronic device and a method for generating and sharing pieces of augmented reality content and supporting interaction between the pieces of augmented reality content to allow a plurality of users to visually transmit and receive an intention expression or an emotion expression therebetween in a situation where they communicate with one another using their electronic devices, each of which is loaded with a camera.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a touch panel, a display, a communication circuit, at least one processor operatively connected with the camera, the touch panel, the display, and the communication circuit, and a memory operatively connected with the at least one processor. The memory may store one or more instructions, when executed, causing the at least one processor to display a first image captured by the camera and a second image received from an external electronic device through the communication circuit on the display, display first augmented reality content on the first image, display second augmented reality content on the second image, and display an animation effect of the first augmented reality content using the second augmented reality content based on a user input through the touch panel.

In accordance with another aspect of the disclosure, a method for providing augmented reality content in an electronic device is provided. The method includes displaying a first image captured by a camera and a second image received from an external electronic device through a communication circuit on a display, displaying first augmented reality content on the first image, displaying second augmented reality content on the second image, and displaying an animation effect of the first augmented reality content using the second augmented reality content based on a user input through a touch panel.

According to various embodiments disclosed in the disclosure, the electronic device and the method for generating and sharing pieces of augmented reality content and supporting interaction between the pieces of augmented reality content may be provided to allow a plurality of users to visually transmit and receive an intention expression or an emotion expression therebetween in a situation where they communicate with one another using their electronic devices, each of which is loaded with a camera.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
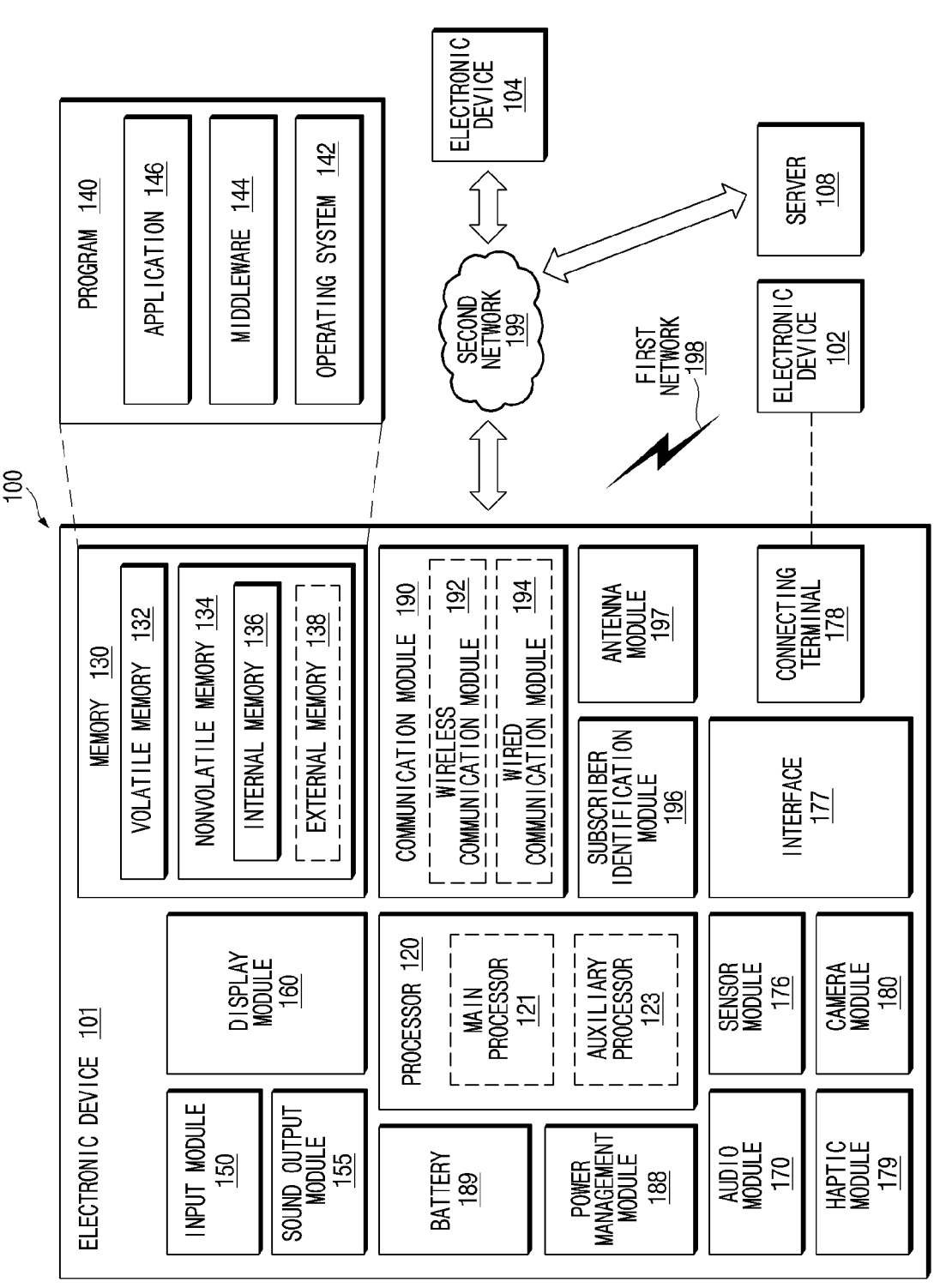
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to yet another embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD- MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, a description will be given of components of an electronic device and an operation of each component according to an embodiment with reference to FIG. 2.

Figure 2:
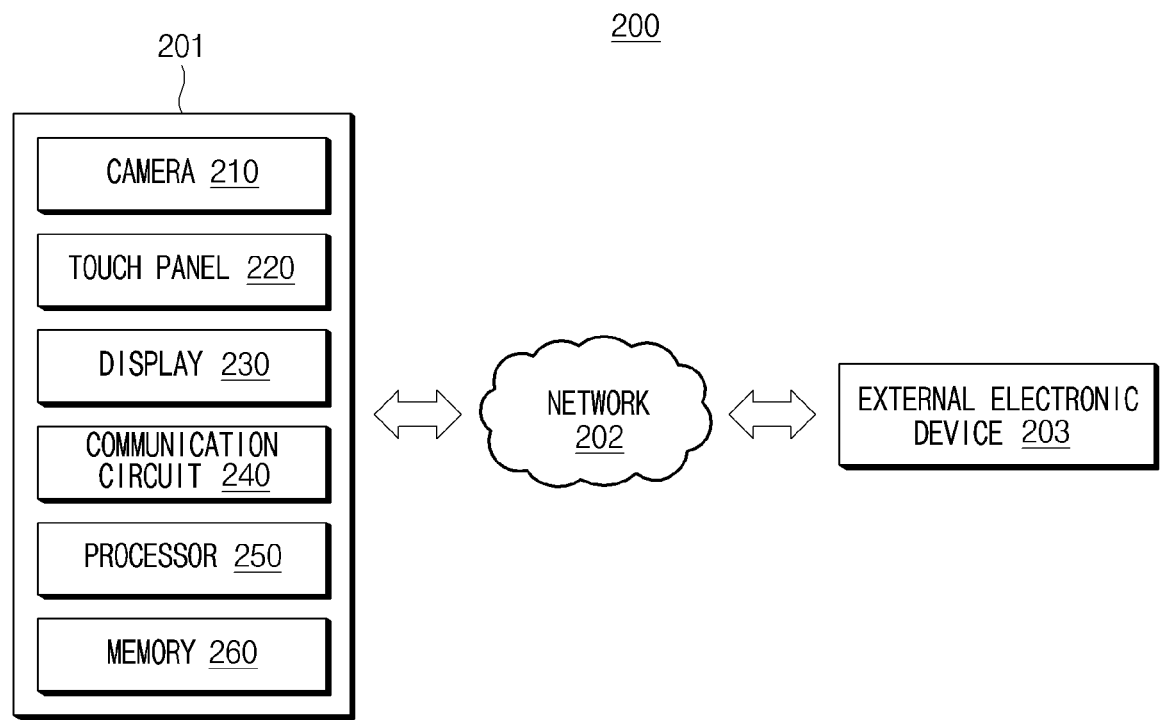
FIG. 2 is a block diagram of an electronic device according to an embodiment of the disclosure.

FIG. 2 is a block diagram of an electronic device according to an embodiment of the disclosure.

Referring to FIG. 2, in a block diagram 200, an electronic device 201 (e.g., an electronic device 101 of FIG. 1) may include a camera 210 (e.g., a camera module 180 of FIG. 1), a touch panel 220 (e.g., a display module 160 of FIG. 1), a display 230 (e.g., the display module 160 of FIG. 1), a communication circuit 240 (e.g., a communication module 190 of FIG. 1), a processor 250 (e.g., a processor 120 of FIG. 1), and a memory 260 (e.g., a memory 130 of FIG. 1).

According to an embodiment, the camera 210 may be disposed in a housing of the electronic device 201 and may capture an external environment of the electronic device 201. According to an embodiment, the camera 210 may be disposed towards the same direction as a direction where a display area of the display 230 is exposed. For example, the camera 210 obtains an image of a user facing the camera 210 across the display 230.

According to an embodiment, the camera 210 may include a plurality of cameras. The plurality of cameras may include a first camera disposed towards the same direction as a direction the display area of the display 230 is exposed and a second camera disposed towards a direction opposite to the direction of the first camera.

According to an embodiment, the touch panel 220 may detect a touch input of the user and may identify an input location thereof. For example, the touch input of the user includes contact or pressure of the user using his or her finger or a stylus pen. According to an embodiment, the touch panel 220 may be integrally formed with the display 230 or may be separately formed to be attached to the display 230. The location of the touch input of the user, which is identified using the touch panel 220, may correspond to a location on the display 230.

According to an embodiment, the display 230 may visually provide the user with information through the display area. According to an embodiment, the display 230 may display an image obtained by the camera 210 or various graphic user interfaces (GUIs).

According to an embodiment, the communication circuit 240 may assist in establishing a communication channel (a wired communication channel or a wireless communication channel) between the electronic device 201 and an external electronic device 203 and transmitting and receiving data over the established communication channel. According to an embodiment, the communication circuit 240 may communicate with the external electronic device 203 over a network 202 (e.g., wifi, cellular network, or the Internet). According to an embodiment, the communication circuit 240 may communicate with at least one external electronic device (e.g., the external electronic device 203) over the network 202.

According to an embodiment, the processor 250 may be operatively connected with the camera 210, the touch panel 220, the display 230, and the communication circuit 240. According to an embodiment, the processor 250 may display the image obtained by the camera 210 on the display 230. According to an embodiment, the processor 250 may provide a preview image of the image obtained by the camera 210 in real time using the display 230.

According to an embodiment, the processor 250 may request a video call from the external electronic device 203 through the communication circuit 240 or may receive a video call request form the external electronic device 203. According to an embodiment, as the video call between the electronic device 201 and the external electronic device 203 is connected, the processor 250 may transmit the real-time image obtained by the camera 210 to the external electronic device 203 through the communication circuit 240 and may receive a real-time image obtained by a camera of the external electronic device 203 through the communication circuit 240.

According to an embodiment, the processor 250 may display the image received from the external electronic device 203 through the communication circuit 240 on the display 230. According to an embodiment, the processor 250 may display a first image obtained by the camera 210 and a second image received from the external electronic device 203 through the communication circuit 240 on the display 230. According to an embodiment, when the electronic device 201 is making a video call connection with the external electronic device 203, the first image and the second image may include preview images obtained by the respective cameras. The first image may include a preview image obtained by the camera 210, and the second image may include a preview image obtained by the camera of the external electronic device 203.

According to an embodiment, the processor 250 may generate augmented reality content based on a user input through the touch panel 220. The augmented reality content may include a virtual 3D object generated in a shape drawn according to the user input. According to an embodiment, the user input for generating the augmented reality content may include a touch input using a finger of the user or a stylus pen. The processor 250 may track a touch input using the touch panel 220 and may connect a trajectory thereof using points or lines to generate a virtual object.

According to an embodiment, the processor 250 may display the generated augmented reality content on at least one of the first image obtained by the camera 210 or the second image received through the communication circuit 240. The processor 250 may additionally display the virtual object on an image of a real environment (e.g., the first image or the second image), which is obtained by the camera 210 or the camera of the external electronic device 203. The processor 250 may overlap and display the augmented reality content with the first image or the second image on the display 230 in response to the location where the user input is detected using the touch panel 220.

According to an embodiment, the processor 250 may fix and display the augmented reality content with respect to a subject recognized from the image. For example, the processor 250 displays the augmented reality content to move together depending on motion of the subject.

According to another embodiment, the processor 250 may fix and display the augmented reality content on specific coordinates of a space recognized based on a three-dimensional coordinate system (e.g., a spherical coordinate system) from the image. For example, although the space captured by the camera (e.g., the camera 210) or a location of the space is changed, the processor 250 displays the augmented reality content to remain in a fixed location. In this case, the processor 250 may fail to display the augmented reality content on the image of the camera, which is displayed on the display 230, as the location where the augmented reality content is fixed deviates from a field of view of the camera, and may display the augmented reality content on the image of the camera, which is displayed on the display 230, as the location where the augmented reality content is fixed enters the field of view of the camera.

According to an embodiment, the processor 250 may transmit augmented reality content generated based on a user input, which is input from a first user who is the user of the electronic device 201, to the external electronic device 203 through the communication circuit 240. For example, as the video call between the electronic device 201 and the external electronic device 203 is connected, the processor 250 transmits the augmented reality content displayed on the image (e.g., the first image or the second image) to the external electronic device 203. According to an embodiment, the augmented reality content may include a virtual object generated based on the user input and location information where the virtual object is mapped to a specific image. The external electronic device 203 may display the augmented reality content received through the communication circuit 240 at a mapped location of a specified image (e.g., the first image or the second image).

According to an embodiment, the processor 250 may receive augmented reality content generated based on a user input, which is input from a second user who is a user of the external electronic device 203, through the communication circuit 240. For example, as the video call between the electronic device 201 and the external electronic device 203 is connected, the processor 250 receives the augmented reality content displayed on the image (e.g., the first image or the second image) from the external electronic device 203. The processor 250 may display the augmented reality content received through the communication circuit 240 at a mapped location of the specified image (e.g., the first image or the second image).

According to an embodiment, the processor 250 may display the augmented reality content generated by the electronic device 201 or the augmented reality content generated by the external electronic device 203 in different colors. In other words, a plurality of users who are making a video call with each other may identify a user who generates the augmented reality content based on the color of the augmented reality content.

According to an embodiment, the processor 250 may display an animation effect of the augmented reality content based on the user input through the touch panel 220. The animation effect of the augmented reality content may include a series of graphic effects indicating a process where a virtual object is moved or where a shape or color of the virtual object is changed.

According to an embodiment, the processor 250 may display an animation effect of first augmented reality content using second augmented reality content, in response to the user input through the touch panel 220. Hereinafter, the first augmented reality content may refer to augmented reality content displayed on the first image, and the second augmented reality content may refer to augmented reality content displayed on the second image. The user input for displaying the animation effect may include various touch inputs, for example, a tap or a double tap of the first augmented reality content or drag and drop for dragging and dropping the first augmented reality content onto a location adjacent to the second augmented reality content (e.g., into an area where the second image is displayed).

As another example, the user input for displaying the animation effect includes a touch input for moving the first augmented reality content by the first user and a touch input for moving the second augmented reality content by the second user. In this case, as it is determined that a distance between the first augmented reality content and the second augmented reality content is within a certain range, the processor 250 may display the animation effect of the first augmented reality content using the second augmented reality content.

According to an embodiment, the animation effect of the first augmented reality content using the second augmented reality content may include a graphic effect where the first augmented reality content interacts with the second augmented reality content. According to an embodiment, the animation effect may be differently specified according to an object included in the augmented reality content and may be stored in the electronic device 201, the external electronic device 203, or an external server (e.g., a server 108 of FIG. 1) connected over the network 202.

According to an embodiment, the processor 250 may identify at least one object included in the first augmented reality content and the second augmented reality content and may display an animation effect corresponding to the object identified from the first augmented reality content and the second augmented reality content among animation effects specified according to the objects on the display 230. For example, as a first object is identified from the first augmented reality content and a second object is identified from the second augmented reality content, the processor 250 displays a first animation effect corresponding to the first object and the second object on the display 230. The first object and the second object may be the same object or different objects.

According to an embodiment, the animation effect may include at least one animation effect for the same object, and the at least one animation effect may be mapped to different user inputs. The processor 250 may receive the user input through the touch panel 220, thus displaying an animation effect mapped to the received user input on the display 230. For example, the processor 250 displays the first animation effect of the first augmented reality content using the second augmented reality content by receiving a first user input (e.g., a double tap) and may display a second animation effect of the first augmented reality content using the second augmented reality content by receiving a second user input (e.g., drag and drop).

According to an embodiment, the processor 250 may transmit the animation effect to the external electronic device 203 through the communication circuit 240, and the external electronic device 203 may display the animation effect on its display.

According to an embodiment, the memory 260 may store various pieces of data used by at least one component (e.g., the processor 250 or the camera 210) of the electronic device 201. The memory 260 may be operatively connected with the processor 250 and may store one or more instructions performed by the processor 250.

According to various embodiments, the electronic device 201 may generate augmented reality content based on a user input while making a video call with at least one external electronic device (e.g., the external electronic device 203) and may transmit the generated augmented reality content to the at least one external electronic device to display the augmented reality content on the electronic device 201 and the display of the at least one external electronic device, thus sharing a visual expression between a plurality of users which are making a video call with each other. As the visual expression is shared, communication among the plurality of users may be smooth. Furthermore, the electronic device 201 may further display an animation effect indicating interaction between pieces of a plurality of augmented reality content based on the user input, thus providing the user with more various visual expressions.

Hereinafter, a description will be given of a method for providing augmented reality content in an electronic device according to an embodiment with reference to FIG. 3.

Figure 3:
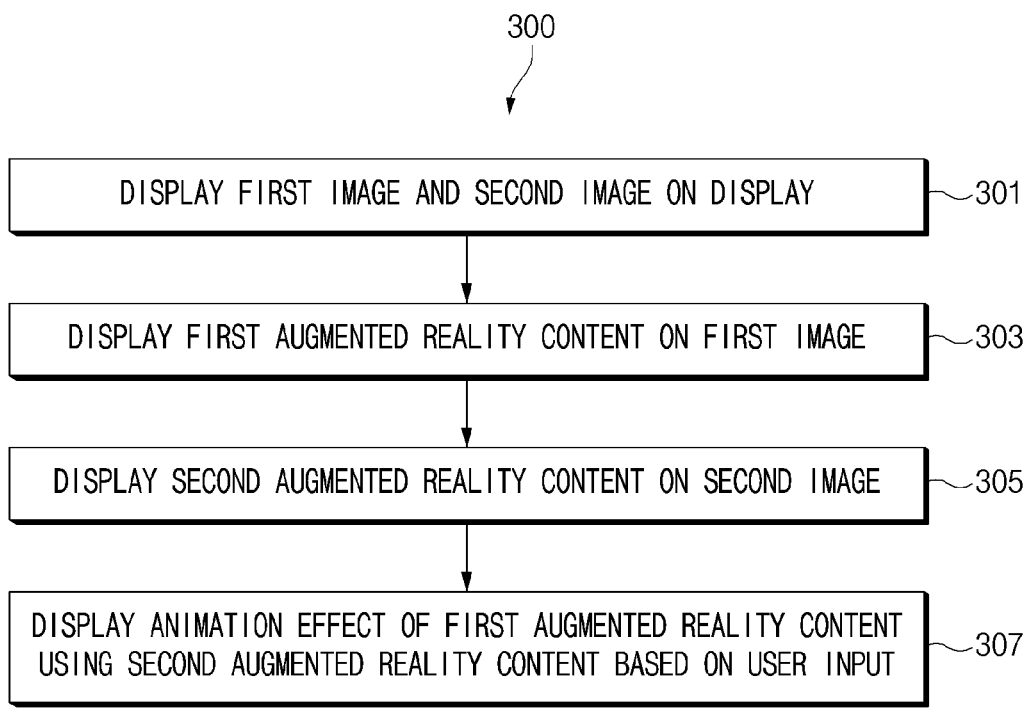
FIG. 3 is a flowchart illustrating an operation of an electronic device according to an embodiment of the disclosure.

FIG. 3 is a flowchart 300 illustrating an operation of an electronic device according to an embodiment of the disclosure. Operations of the electronic device, which will be described below, may be performed by an electronic device 201 of FIG. 2 or a processor 250 of the electronic device 201.

According to an embodiment, as a video call is connected with an external electronic device, the electronic device may perform a process shown in FIG. 3.

In operation 301, the electronic device may display a first image and a second image on a display (e.g., a display 230 of FIG. 2). According to an embodiment, the first image may include an image captured by a camera (e.g., a camera 210 of FIG. 2) of the electronic device. According to an embodiment, the second image may include an image received from an external electronic device (e.g., an external electronic device 203 of FIG. 2) through a communication circuit (e.g., a communication circuit 240 of FIG. 2) of the electronic device. The second image may include an image captured by a camera of the external electronic device. According to an embodiment, the first image and the second image may be real-time image data including a preview image before the image captured by each camera of the electronic device or the external electronic device is stored.

According to an embodiment, the electronic device may receive images from a plurality of external electronic devices and may display a first image and a plurality of second images on the display.

According to an embodiment, the electronic device may transmit the first image to the external electronic device, and the external electronic device may display the first image and the second image on the display of the external electronic device.

In operation 303, the electronic device may display first augmented reality content on the first image. According to an embodiment, the first augmented reality content may be generated based on a user input detected through a touch panel (e.g., a touch panel 220 of FIG. 2) of the electronic device. The user input may include a touch input performed by a user of the electronic device using his or her finger or a stylus pen. According to an embodiment, the first augmented reality content may include a virtual object generated by the electronic device to track the touch input of the user and have a shape according to a trajectory thereof. For example, when the user of the electronic device draws on the display using the finger or the stylus pen, the electronic device imitates the shape of a picture or letter drawn by the user to generate a virtual object.

According to an embodiment, the electronic device may display augmented reality content at a location on the display where the user input for generating the augmented reality content is detected. According to an embodiment, as the user draws on an area of the display where the first image is displayed, the electronic device may generate and display first augmented reality content on the first image.

The case where the electronic device generates the virtual object having the shape according to the trajectory of the touch input is exemplified as the method for generating the augmented reality content based on the user input in the above-mentioned embodiment, but not limited thereto. The electronic device may generate a virtual object in a specified form selected based on a selective input of the user.

The case where the first augmented reality content is generated by the electronic device is exemplified in the above-mentioned embodiment, but not limited thereto. The first augmented reality content may include augmented reality content which is generated by the external electronic device and is received over the network. For example, the first augmented reality content is generated based on a touch input which is input on an area where the first image is displayed on a display of the external electronic device.

In operation 305, the electronic device may display second augmented reality content on the second image. According to an embodiment, the second augmented reality content may include augmented reality content received by the electronic device from the external electronic device. The second augmented reality content may be generated based on, for example, a user input detected through a touch panel of the external electronic device. The user input for generating the augmented reality content is described above in conjunction with the first augmented reality content, a duplicated description will be brief or omitted. For example, when the user of the external electronic device draws on the display of the external electronic device using the finger or the stylus pen, the external electronic device imitates the shape of a picture or letter drawn by the user to generate a virtual object.

According to an embodiment, the electronic device may receive and display the second augmented reality content generated by the external electronic device on the display of the electronic device. According to an embodiment, as the user of the external electronic device draws on an area of the display of the external electronic device where the second image is displayed, the electronic device may and display the second augmented reality content received from the external electronic device on the second image.

The case where the second augmented reality content is generated by the external electronic device and is received from the external electronic device is exemplified in the above-mentioned embodiment, but not limited thereto. The second augmented reality content may include augmented reality content generated based on the user input through the touch panel of the electronic device. For example, the second augmented reality content includes augmented reality content generated by the electronic device as the electronic device detects a touch input which is input on the area where the second image is displayed on the display of the electronic device.

In operation 307, the electronic device may display an animation effect of the first augmented reality content using the second augmented reality content based on the user input. According to an embodiment, the animation effect of the first augmented reality content using the second augmented reality content may include a graphic effect where a virtual object included in the first augmented reality content interacts with a virtual object included in the second augmented reality content. The animation effect of the first augmented reality content using the second augmented reality content may include, for example, a series of graphic effects indicating a process where at least one virtual object included in the first augmented reality content and the second augmented reality content is moved or where a shape or color of the at least one virtual object is changed.

According to an embodiment, the electronic device may receive a user input for displaying the animation effect of the first augmented reality content through the touch panel. The user input for displaying the animation effect of the first augmented reality content may include various touch inputs, for example, a tap or a double tap of the first augmented reality content or drag and drop for dragging and dropping the first augmented reality content onto a location adjacent to the second augmented reality content (e.g., into an area where the second image is displayed).

In this case, the processor 250 may display the animation effect of the first augmented reality content using the second augmented reality content based on distance information between the first augmented reality content and the second augmented reality content. For example, the distance between the first augmented reality content and the second augmented reality content is changed by at least one of a user input for moving the first augmented reality content input to the electronic device or a user input for moving the second augmented reality content input to the external electronic device. In this case, as it is determined that the distance between the first augmented reality content and the second augmented reality content is within a certain range, the electronic device may display the animation effect of the first augmented reality content using the second augmented reality content.

Hereinafter, a description will be given of a user interface for displaying an animation effect using pieces of a plurality of augmented reality content in the electronic device according to an embodiment with reference to FIGS. 4A and 4B.

Figure 4A:
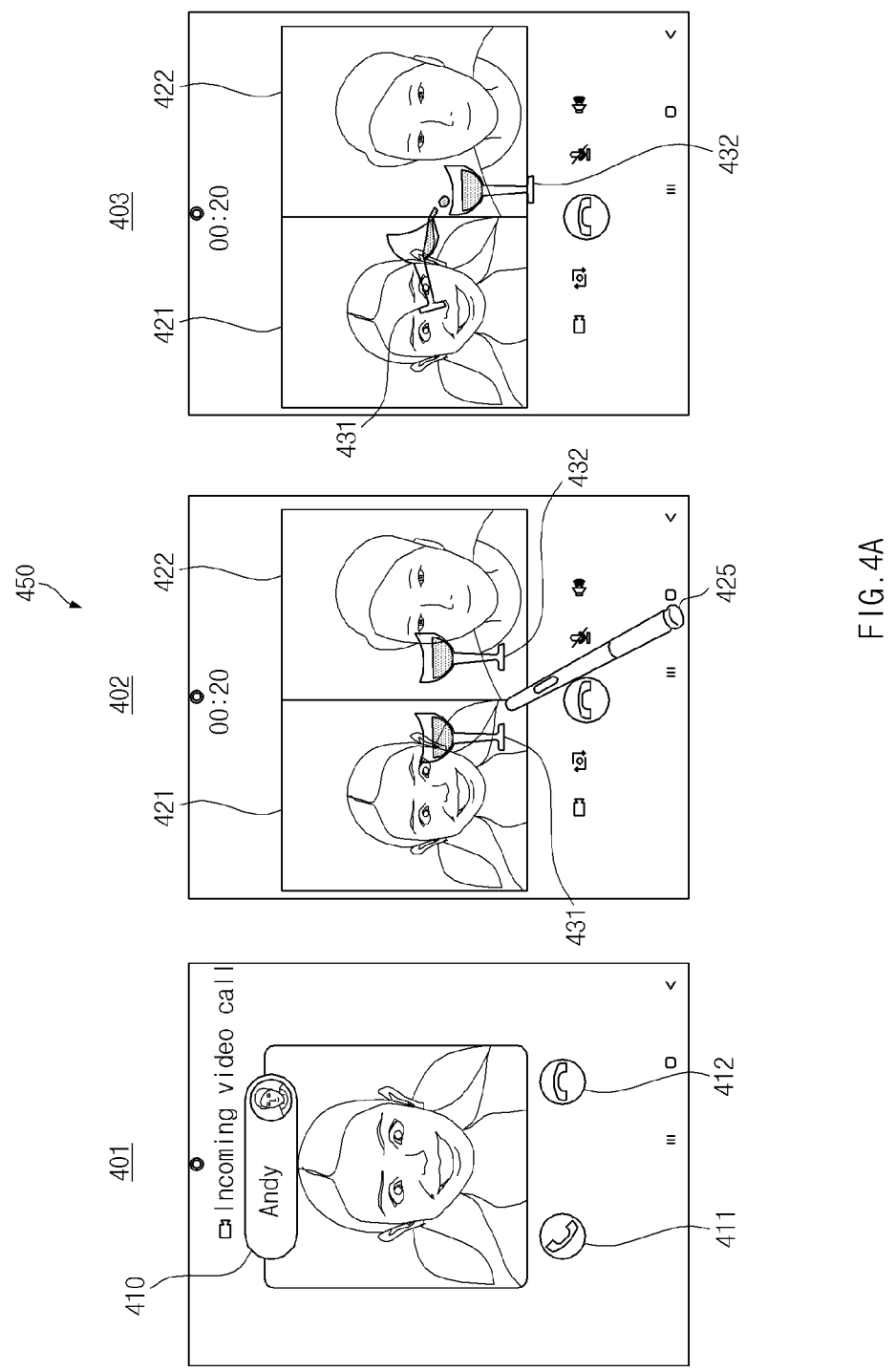
FIGS. 4A and 4B are drawings illustrating a user interface provided by an electronic device according to various embodiments of the disclosure.
Figure 4B:
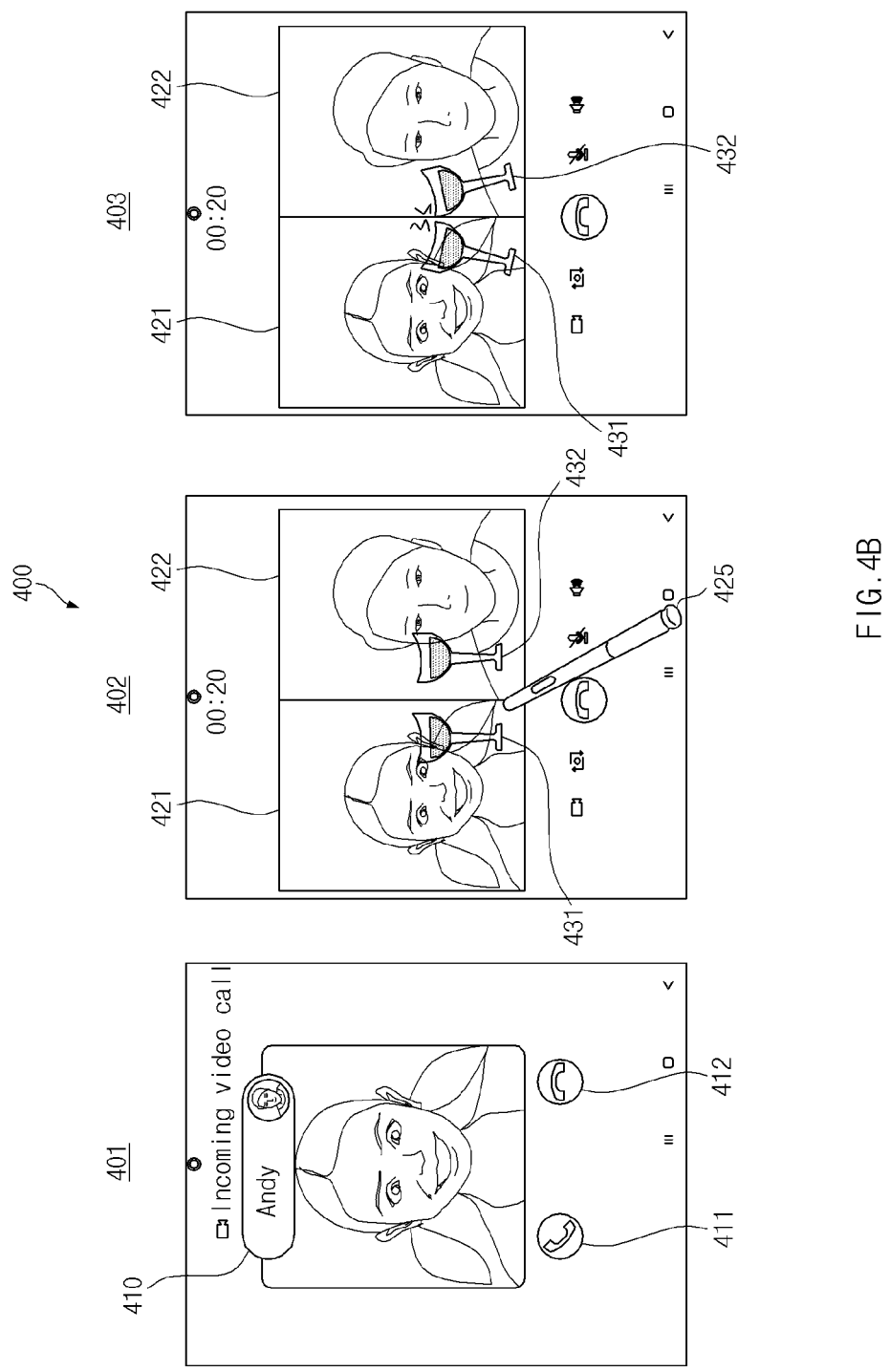

FIGS. 4A and 4B are drawings illustrating a user interface provided by an electronic device according to various embodiments of the disclosure. Operations of the electronic device, which will be described below, may be performed by an electronic device 201 of FIG. 2 or a processor 250 of the electronic device 201.

Referring to FIGS. 4A and 4B, in drawings 400 and 450, the electronic device may receive a video call request from an external electronic device (e.g., an external electronic device 203 of FIG. 2) connected over a network (e.g., a network 202 of FIG. 2). The electronic device may receive the video call request from the external electronic device, thus displaying a first user interface 401 on a display (e.g., a display 230 of FIG. 2).

According to an embodiment, the first user interface 401 may include a user interface for receiving an acknowledgement to whether to accept/reject the video call request received from the external electronic device from a user. For example, the first user interface 401 includes a notification 410 for providing a notification of reception of the video call request and including information about a caller (e.g., Andy) who request a video call, a first button 411 to which an operation of establishing a video call connection is mapped, and a second button 412 to which an operation of blocking the video call connection is mapped. For example, the user selects the first button 411 for accepting a video call and may select the second button 412 for rejecting the video call.

The electronic device may receive the user input for selecting the first button 411, thus establishing a video call connection with the external electronic device. As the video call is connected with the external electronic device, the electronic device may display a second user interface 402 on its display.

According to an embodiment, the second user interface 402 may include a first image 421 captured by a camera (e.g., a camera 210 of FIG. 2) and a second image 422 received from the external electronic device. According to an embodiment, the second image 422 may include an image captured by a camera of the external electronic device. While the electronic device and the external electronic device make a video call connection with each other, the first image 421 and the second image 422 may be real-time images obtained by the cameras of the respective devices.

According to an embodiment, the electronic device may display first augmented reality content 431 on the first image 421 based on a user input using a stylus pen 425. The electronic device may detect a user input through its touch panel. For example, when the user draws a wine glass with wine on the first image 421 using the stylus pen 425, the electronic device generates and displays the first augmented reality content 431 in the shape of the wine glass with wine on the first image 421.

According to an embodiment, the electronic device may receive second augmented reality content 432 from the external electronic device. For example, when a user of the external electronic device draws a wine glass with wine on the second image 422 using a stylus pen, the external electronic device generates and transmits the second augmented reality content 432 in the shape of the wine glass with wine to the electronic device. The electronic device may display the second augmented reality content 432 received from the external electronic device on the second image 422.

The case where the first augmented reality content 431 is generated by the electronic device and the second augmented reality content 432 is generated by the external electronic device is exemplified in the above-mentioned embodiment, but not limited thereto. According to various embodiments, the first augmented reality content 431 may be generated by the external electronic device and may be transmitted to the electronic device based on a user input which is input through a touch panel corresponding to an area where the first image 421 is displayed on the display of the external electronic device. According to various embodiments, the second augmented reality content 432 may be generated based on a user input which is input through a touch panel corresponding to an area where the second image 422 is displayed on the display of the electronic device.

According to an embodiment, the electronic device may receive a user input for displaying an animation effect where the first augmented reality content 431 and the second augmented reality content 432 interact with each other through the touch panel. For example, the electronic device detects a touch input for tapping or double-tapping on the first augmented reality content 431 or the second augmented reality content 432 using the stylus pen 425, dragging and dropping the first augmented reality content 431 onto a location adjacent to the second augmented reality content 432, or dragging and dropping the second augmented reality content 432 onto a location adjacent to the first augmented reality content 431.

According to an embodiment, the electronic device may receive a specified user input through the touch panel, thus displaying a third user interface 403 on the display. According to an embodiment, the electronic device may display an animation effect using the first augmented reality content 431 and the second augmented reality content 432 on the third user interface 403.

According to an embodiment, the electronic device may receive a specified input for displaying an animation effect, thus identifying objects included in the first augmented reality content 431 and the second augmented reality content 432 and displaying an animation effect corresponding to the identified objects.

Referring to FIG. 4A, for example, when the user drags and drops the first augmented reality content 431 onto the location adjacent to the second augmented reality content 432 using the stylus pen 425, the electronic device identifies a pair of wine glasses as virtual objects included in the first augmented reality content 431 and the second augmented reality content 432 and may display an animation effect where the wine glass corresponding to the first augmented reality content 431 pours wine into the wine glass corresponding to the second augmented reality content 432.

Referring to FIG. 4B, for example, when the user double-taps the first augmented reality content 431 using the stylus pen 425, the electronic device identifies a pair of wine glasses as virtual objects included in the first augmented reality content 431 and the second augmented reality content 432 and displays an animation effect where the pair of wine glasses bump into each other to toast.

Referring to FIGS. 4A and 4B, the electronic device may display a first animation effect (e.g., pouring wine from one wine glass to another) by receiving a first user input (e.g., drag and drop) on the first augmented reality content 431 and the second augmented reality content 432 identified as the wine glasses and may display a second animation effect (e.g., making a toast with two wine glasses while the wine glasses bump into each other) by receiving a second user input (e.g., a double tap) of a type different from the first user input. In other words, the electronic device may display different animation effects depending on user inputs with respect to the same objects as the wine glasses. The electronic device may display an animation effect corresponding to a user input among at least one animation effect with respect to the same objects.

The virtual object identified from the first augmented reality content 431 and the virtual object identified from the second augmented reality content 432 are the same as each other in embodiments shown in FIGS. 4A and 4B, but not limited thereto. The virtual object identified from the first augmented reality content 431 and the virtual object identified from the second augmented reality content 432 may be different objects. For example, the first augmented reality content includes a bat and the second augmented reality content includes a ball. For example, the electronic device receives a user input for double-tapping the bat, thus displaying an animation effect where the ball is hit with the bat.

According to the above-mentioned embodiment, the electronic device may display an animation effect according to the at least one object included in the first augmented reality content 431 and the second augmented reality content 432 in response to a specified user input. According to an embodiment, the electronic device may identify at least one object included in the first augmented reality content 431 and the second augmented reality content 432 and may display an animation effect corresponding to the identified at least one object among animation effects specified according to the objects. For example, the animation effects specified according to the objects is stored in a memory (e.g., a memory 260 of FIG. 2) of the electronic device or an external server (e.g., a server 108 of FIG. 1) connected with the electronic device over the network. The electronic device may search for and display an animation effect corresponding to at least one object identified from the first augmented reality content 431 and the second augmented reality content 432 among the animation effects stored in the memory or the external server on the display.

Hereinafter, a description will be given of a method for providing augmented reality content in an electronic device according to an embodiment with reference to FIG. 5.

Figure 5:
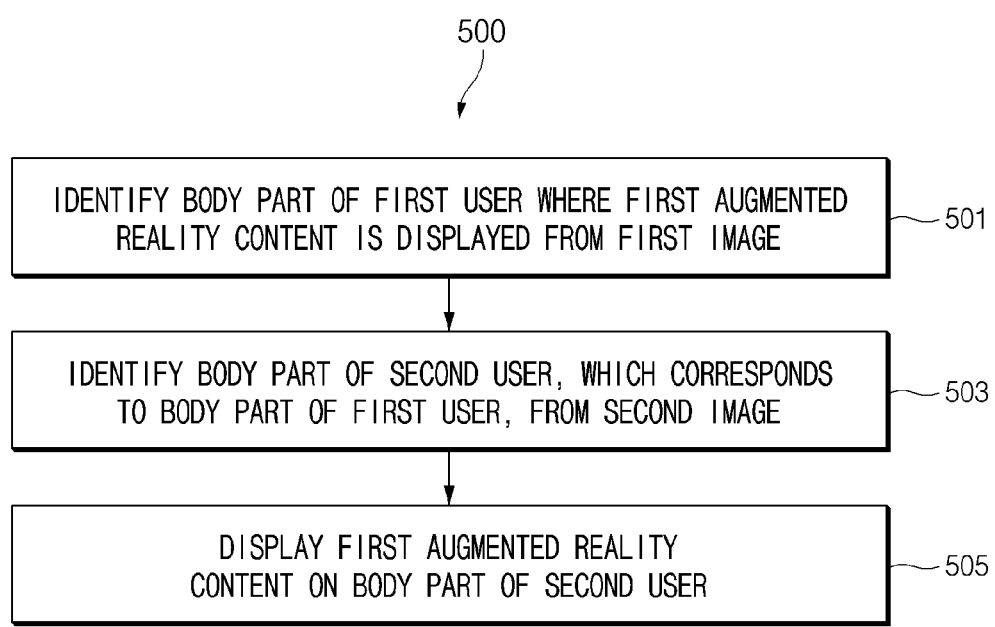
FIG. 5 is a flowchart illustrating an operation of an electronic device according to an embodiment of the disclosure.

FIG. 5 is a flowchart illustrating an operation of an electronic device according to an embodiment of the disclosure. Operations of the electronic device, which will be described below, may be performed by an electronic device 201 of FIG. 2 or a processor 250 of the electronic device 201.

According to an embodiment, while the electronic device makes a video call connection with an external electronic device, it may perform a process shown in FIG. 5. According to an embodiment, the electronic device may perform the process shown in FIG. 5 after performing operation 301 and operation 303 shown in FIG. 3.

Referring to FIG. 5, in a method 500, in operation 501, the electronic device may identify a body part of a first user where first augmented reality content is displayed from a first image. According to an embodiment, the first image may include an image where a front camera or a rear camera of the electronic device captures the first user. The electronic device may identify the body part of the first user from the first image based on an object recognition technology. The object recognition technology may include a technology for identifying an object on an image or video and a location of the object using a deep-learning algorithm or a machine-learning algorithm. According to an embodiment, the electronic device may identify a body part of the first user from the first image and may identify a location of the identified body part of the first user on the first image.

According to the above, the electronic device may fix and display augmented reality content on an object or may fix and display the augmented reality content on a space. In the embodiment, it is assumed that the electronic device fixes and displays augmented reality content on a body part of the user, which is identified from the image.

According to an embodiment, the electronic device may identify a body part of the first user, which corresponds to a location where the first augmented reality content is displayed, based on a location of the body part of the first user, which is identified from the first image. For example, when a location where the first augmented reality content is displayed on the first image is a first location and when the first location is identified as a right cheek of the first user, the electronic device identifies a body part of the first user where the first augmented reality content is displayed as the right cheek.

In operation 503, the electronic device may identify a body part of a second user, which corresponds to the body part of the first user, from a second image. According to an embodiment, the second image may be an image received by the electronic device from an external electronic device through a communication circuit, which may include an image where a camera of the external electronic device captures the second user. According to an embodiment, the electronic device may identify a body part of the second user from the second image. Because the method for identifying the body part of the user from the image in the electronic device is described above in the description of operation 501, a duplicated description will be brief or omitted. According to an embodiment, the electronic device may identify a body part of the second user from the second image and may identify a location of the identified body part of the second user on the second image.

According to an embodiment, the electronic device may identify a body part of the second user, which corresponds to the body part of the first user, which is identified as operation 501 is performed, in the identified body part of the second user. According to an embodiment, the body part of the second user, which corresponds to the body part of the first user, may include the same body part as the body part of the first user. The electronic device may identify the same body part as the body part of the first user, which is identified as the location where the first augmented reality content is displayed as operation 501 is performed, from the second image, and may identify a location of the identified body part on the second image. For example, when identifying the body part of the first user where the first augmented reality content is displayed as a right cheek as operation 501 is performed, the electronic device identifies a location of the right cheek of the second user on the second image by performing operation 503.

In operation 505, the electronic device may display the first augmented reality content on the body part of the second user. According to an embodiment, the electronic device may display the first augmented reality content on the location of the body part of the second user on the second image, which is identified as operation 503 is performed.

Although not illustrated in FIG. 5, the electronic device according to an embodiment may transmit the first augmented reality content to the external electronic device. According to an embodiment, the electronic device may transmit the first image where the first augmented reality content is displayed to the external electronic device. For example, the electronic device may transmit location information where the first augmented reality content is displayed on the first image or body part information of the first user where the first augmented reality content is displayed to the external electronic device. According to an embodiment, the external electronic device may display the first augmented reality content on first image based on the location information or the body part information of the first user. The external electronic device may display the first augmented reality content on the location on the first image, which corresponds to the location information or the body part information of the first user.

According to an embodiment, the electronic device may generate and display the first augmented reality content on a specific body part of the first user based on the user input while making a video call connection with the external electronic device and may display the same augmented reality content (the first augmented reality content) on a location corresponding to the same body part as the specific body part of the first user on an image of another user (e.g., the second user) who are making a video call with the first user to allow a plurality of users to intuitively recognize that a visual expression is shared, thus improving user experience.

Hereinafter, a description will be given of a user interface where the electronic device according to an embodiment displays augmented reality content, which is generated based on a user input and is displayed on the first image, on a corresponding location of the second image with reference to FIG. 6.

Figure 6:
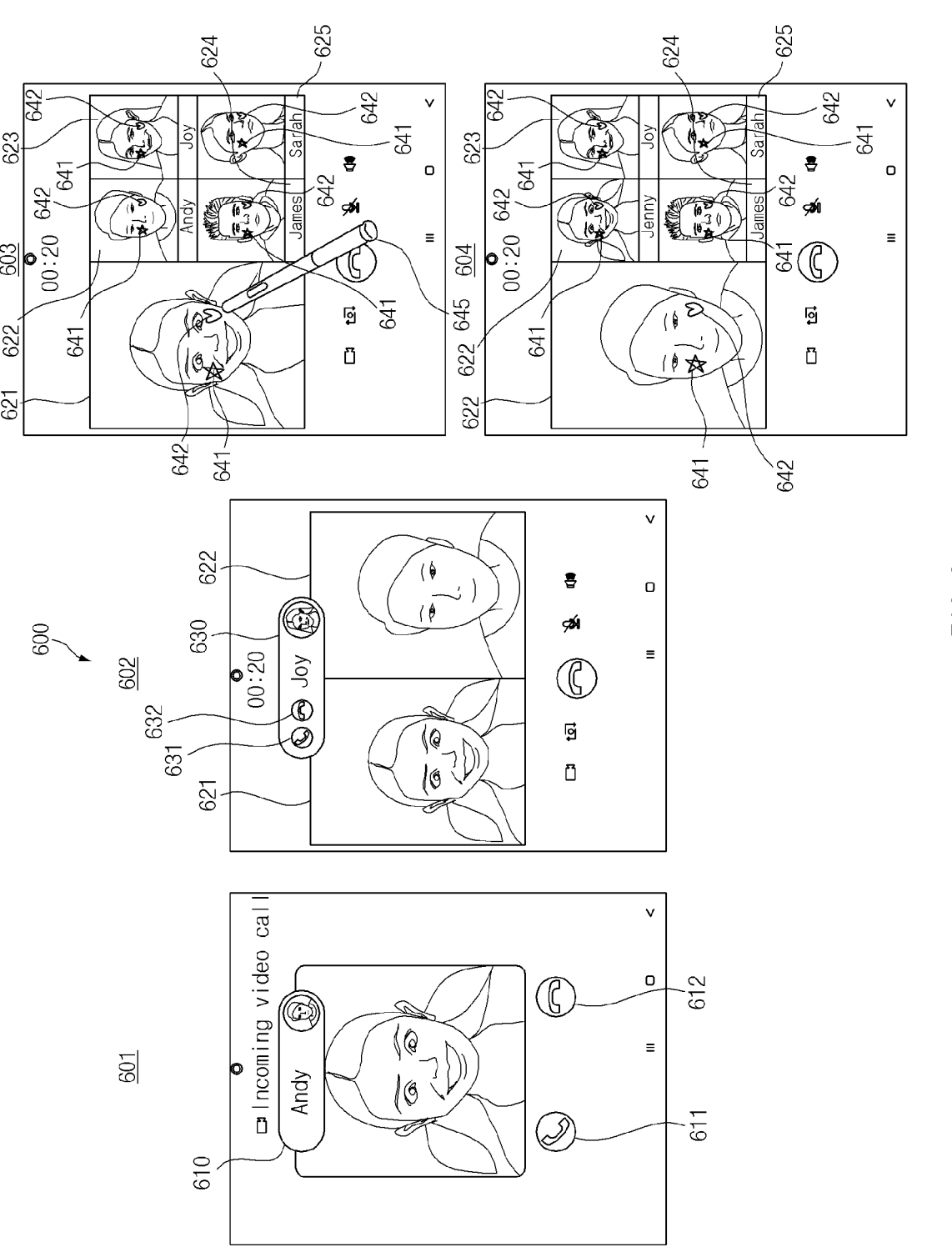
FIG. 6 is a drawing illustrating user interfaces provided by an electronic device and an external electronic device according to an embodiment of the disclosure.

FIG. 6 is a drawing illustrating user interfaces provided by an electronic device and an external electronic device according to an embodiment of the disclosure. Operations of the electronic device, which will be described below, may be performed by an electronic device 201 of FIG. 2 or a processor 250 of the electronic device 201.

Referring to FIG. 6, in a drawing 600, the electronic device may receive a video call request from an external electronic device (e.g., an external electronic device 203 of FIG. 2) connected over a network (e.g., a network 202 of FIG. 2). The electronic device may receive a video call request from a first external electronic device, thus displaying a first user interface 601 on a display (e.g., a display 230 of FIG. 2).

According to an embodiment, the first user interface 601 may correspond to a first user interface 401 shown in FIGS. 4A and 4B. For example, the first user interface 601 includes a notification 610 for providing a notification of reception of the video call request and including information about a caller (e.g., Andy) who request a video call, a first button 611 to which an operation of accepting the video call request is mapped, and a second button 612 to which an operation of rejecting the video call request is mapped.

The electronic device may receive a user input for selecting the first button 611, thus establishing a video call connection with the external electronic device. According to an embodiment, as the video call is connected with the external electronic device, the electronic device may display a second user interface 602 on its display.

According to an embodiment, the second user interface 602 may include a first image 621 captured by a camera (e.g., a camera 210 of FIG. 2) of the electronic device and a second image 622 received from the first external electronic device. According to an embodiment, the first image 621 may include an image where a camera of the electronic device captures a first user, and the second image 422 may include an image where a camera of the first external electronic device captures a second user (e.g., Andy).

According to various embodiments, the electronic device may support a video call among a plurality of users. According to an embodiment, the electronic device may receive a video call request from a second external electronic device which is making a video call connection with the first external electronic device. According to an embodiment, the electronic device may receive a video call request from the second external electronic device, thus displaying a notification 630 on the display. According to an embodiment, the second user interface 602 may include the notification 630.

According to an embodiment, the notification 630 may be to provide a notification of the video call request received from the second external electronic device and may include information about a caller (e.g., Joy) who requests a video call. According to an embodiment, the notification 630 may include a first button 611 to which an operation of establishing a video call connection is mapped and a second button 612 to which an operation of blocking the video call connection is mapped. For example, the user may select the first button 611 for accepting a video call and selects the second button 612 for rejecting the video call.

According to an embodiment, the electronic device may receive a user input for selecting the first button 611, thus displaying a third image received from the second external electronic device on the display. For example, the third image includes an image where the second external electronic device captures the third user (e.g., Joy).

According to various embodiments, the electronic device may make a video call connection with a plurality of external electronic device, thus displaying a third user interface 603 on the display. According to an embodiment, the third user interface 603 may include a first image 621 captured by the camera of the electronic device, a second image 622 received from the first external electronic device, a third image 623 received from the second external electronic device, a fourth image 624 received from a third external electronic device, and a fifth image 625 received from a fourth external electronic device. For example, the first image 621 is an image where the electronic device captures the first user (e.g., Jenny), the second image 622 is an image where the first external electronic device captures the second user (e.g., Andy), the third image 623 is an image where the second external electronic device captures the third image (e.g., Joy), the fourth image 624 is an image where the third external electronic device captures a fourth user (e.g., James), and the fifth image 625 is an image where the fourth external electronic device captures a fifth user (e.g., Sarah).

According to an embodiment, the electronic device may change a size and a layout where images are displayed depending on the number of the images. For example, the electronic device displays the first image 621 captured by the electronic device to be larger than the second image 622, the third image 623, the fourth image 624, and the fifth image 625 received from the external electronic device and may arrange and display the second image 622, the third image 623, the fourth image 624, and the fifth image 625 in the form of a tile, but not limited thereto. The electronic device may display the plurality of images at various sizes and layouts.

According to an embodiment, the electronic device may display pieces of first augmented reality content 641 and 642 on the first image 621 based on a user input using a stylus pen 645. The electronic device may detect a user input through its touch panel. For example, when the user draws a star on the first image 621 using the stylus pen 645, the electronic device generates and displays the first augmented reality content 641 in the shape of the star on the first image 621. Furthermore, when the user draws a heart on the first image 621 using the stylus pen 645, the electronic device may generate and display the first augmented reality content 642 in the shape of the heart on the first image 621.

According to an embodiment, the electronic device may identify body parts of the first user where the pieces of first augmented reality content 641 and 642 are displayed from the first image 621. For example, the electronic device identifies that the body part of the first user where the first augmented reality content 641 in the shape of the star is displayed is a right cheek and that the body part of the first user where the first augmented reality content 642 in the shape of the heart is displayed is a left cheek.

According to an embodiment, the electronic device may identify a body part of another user, which corresponds to the body part (e.g., the right cheek or the left cheek) of the first user where the first augmented reality content 641 or 642 is displayed from at least one image received from the external electronic device. For example, the electronic device identifies a right cheek or a left cheek of the second user (e.g., Andy) from the second image 622. The electronic device may display the first augmented reality content 641 in the shape of the star on the right cheek of the second user (e.g., Andy) and may display the first augmented reality content 642 in the shape of the heart on the left cheek. The electronic device may display the pieces of first augmented reality content 641 and 642 on the third image 623, the fourth image 624, and the fifth image 625 like the second image 622.

According to an embodiment, the electronic device may transmit the first image 621 and the pieces of first augmented reality content 641 and 642 to the external electronic device over a network (e.g., a network 202 of FIG. 2). The electronic device may transmit location information where the pieces of first augmented reality content 641 and 642 are displayed on the first image 621 to the external electronic device.

According to an embodiment, when the electronic device displays the third user interface 603, the first external electronic device may display a fourth user interface 604. The fourth user interface 604 may include the first to fifth images 621 to 625. According to an embodiment, the first external electronic device may display the second image 622 captured by the first external electronic device to be larger than the first image 621, the third image 623, the fourth image 624, and the fifth image 625.

According to an embodiment, the first external electronic device may display the first augmented reality content 641 or 642 on the first image 621 based on location information of the first augmented reality content 641 or 642 transmitted from the electronic device on the first image 621. The first external electronic device may display the first augmented reality content 641 in the shape of the star on the right cheek of the first user (e.g., Jenny) and may display the first augmented reality content 642 in the shape of the heart on the left cheek of the first user (e.g., Jenny).

According to an embodiment, the first external electronic device may identify a body part of the first user (e.g., Jenny) where the first augmented reality content 641 or 642 is displayed from the first image 621 and may display the first augmented reality content 641 or 642 on a body part of the second user (e.g., Andy), which corresponds to the identified body part of the first user (e.g., Jenny), on the second image 622. The first external electronic device may display the first augmented reality content 641 or 642 on the third image 623, the fourth image 624, and the fifth image 625 as described above. The first external electronic device may display the first augmented reality content 641 in the shape of the star on each of right cheeks of the second user (e.g., Andy), the third user (e.g., Joy), the fourth user (e.g., James), and the fifth user (e.g., Sarah) and may display the first augmented reality content in the shape of the heart on each of left cheeks of the second user (e.g., Andy), the third user (e.g., Joy), the fourth user (e.g., James), and the fifth user (e.g., Sarah).

Hereinafter, a description will be given of a user interface where the electronic device according to an embodiment displays augmented reality content, which is generated based on a user input, on the second image with reference to FIG. 7.

Figure 7:
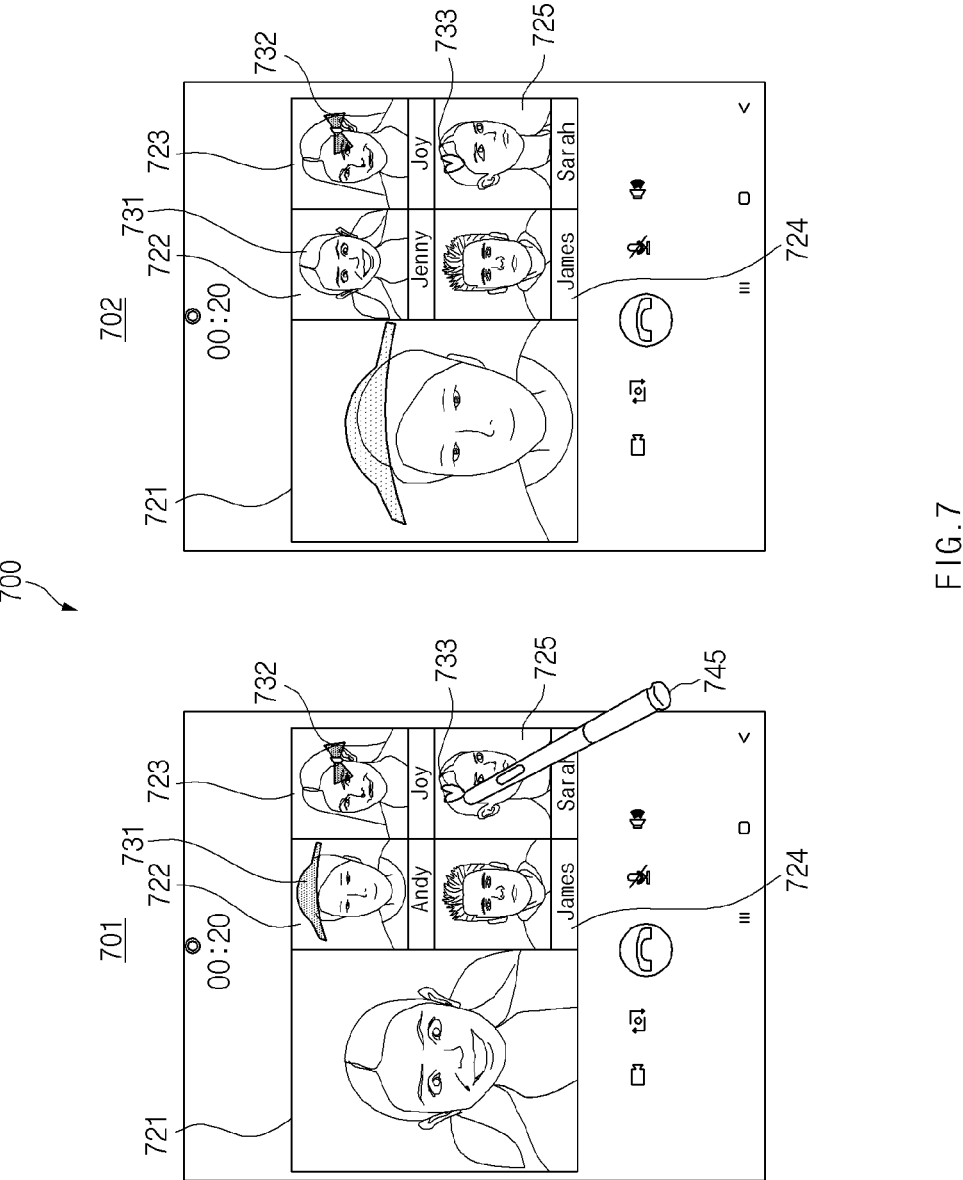
FIG. 7 is a drawing illustrating user interfaces provided by an electronic device and an external electronic device according to an embodiment of the disclosure.

FIG. 7 is a drawing illustrating user interfaces provided by an electronic device and an external electronic device according to an embodiment of the disclosure. Operations of the electronic device, which will be described below, may be performed by an electronic device 201 of FIG. 2 or a processor 250 of the electronic device 201.

Referring to FIG. 7, in a drawing 700, the electronic device may receive a video call request from an external electronic device (e.g., an external electronic device 203 of FIG. 2) connected over a network (e.g., a network 202 of FIG. 2). The electronic device may receive video call requests from a plurality of external electronic devices, thus displaying a first user interface 701 on a display (e.g., a display 230 of FIG. 2).

According to an embodiment, the first user interface 701 may include a first image 721 captured by a camera (e.g., a camera 210 of FIG. 2) of the electronic device, a second image 722 received from a first external electronic device, a third image 723 received from a second external electronic device, a fourth image 724 received from a third external electronic device, and a fifth image 725 received from a fourth external electronic device. For example, the first image 721 is an image where the electronic device captures a first user (e.g., Jenny), the second image 722 may be an image where the first external electronic device captures a second user (e.g., Andy), the third image 723 may be an image where the second external electronic device captures a third user (e.g., Joy), the fourth image 724 may be an image where the third external electronic device captures a fourth user (e.g., James), and the fifth image 725 may be an image where the fourth external electronic device captures a fifth user (e.g., Sarah).

According to an embodiment, the electronic device may display augmented reality content on at least one of the first image 721, the second image 722, the third image 723, the fourth image 724, or the fifth image 725 based on a user input using a stylus pen 745. The electronic device may detect a user input through its touch panel. For example, when the user draws a hat on the second image 722 using the stylus pen 745, the electronic device generates and displays first augmented reality content 731 in the shape of the hat on the second image 722. Furthermore, when the user draws a ribbon on the third image 723 using the stylus pen 745, the electronic device may generate and display second augmented reality content 732 in the shape of the ribbon on the third image 723. Furthermore, when the user draws a heart on the fifth image 725 using the stylus pen 745, the electronic device may generate and display third augmented reality content 733 in the shape of the heart on the fifth image 725.

The case where the electronic device generates and displays pieces of augmented reality content for the second image 722, the third image 723, and the fifth image 725 on corresponding images in the above-mentioned embodiment is exemplified, but not limited thereto. The electronic device may generate and display each of pieces of augmented reality content based on a user input on each of images received from at least one external electronic device.

According to an embodiment, the electronic device may transmit augmented reality content generated for each image to the external electronic device over a network (e.g., a network 202 of FIG. 2). For example, the electronic device transmits first augmented reality content 731 generated for the second image 722, second augmented reality content 732 generated for the third image 723, and third augmented reality content 733 generated for the fifth image 725 to the external electronic device (e.g., first to fourth external electronic devices).

According to an embodiment, when the electronic device displays the first user interface 701, the first external electronic device may display a second user interface 702. The second user interface 702 may include the first to fifth images 721 to 725. According to an embodiment, the first external electronic device may display the second image 722 captured by the first external electronic device to be larger than the first image 721, the third image 723, the fourth image 724, and the fifth image 725.

According to an embodiment, the first external electronic device may display the first augmented reality content 731, the second augmented reality content 732, and the third augmented reality content 733 transmitted from the electronic device on corresponding images, respectively. For example, the first external electronic device displays the first augmented reality content 731 on the second image 722, displays the second augmented reality content 732 on the third image 723, and displays the third augmented reality content 733 on the fifth image 725.

According to an embodiment, the first external electronic device may adjust a size of augmented reality content to correspond to sizes of the first to fifth images 721 to 725. For example, the first external electronic device displays the second image 722 to be larger than the first image 721, the third image 723, the fourth image 724, and the fifth image 725, thus displaying the first augmented reality content 731 displayed on the second image 722 to be larger than the second augmented reality content 732 and the third augmented reality content 733. According to an embodiment, the first augmented reality content 731 displayed on the second image 722 by the first external electronic device may be larger in size than the first augmented reality content 731 when transmitted to the electronic device.

Hereinafter, a description will be given of a method for providing augmented reality content in an electronic device according to an embodiment with reference to FIG. 8.

Figure 8:
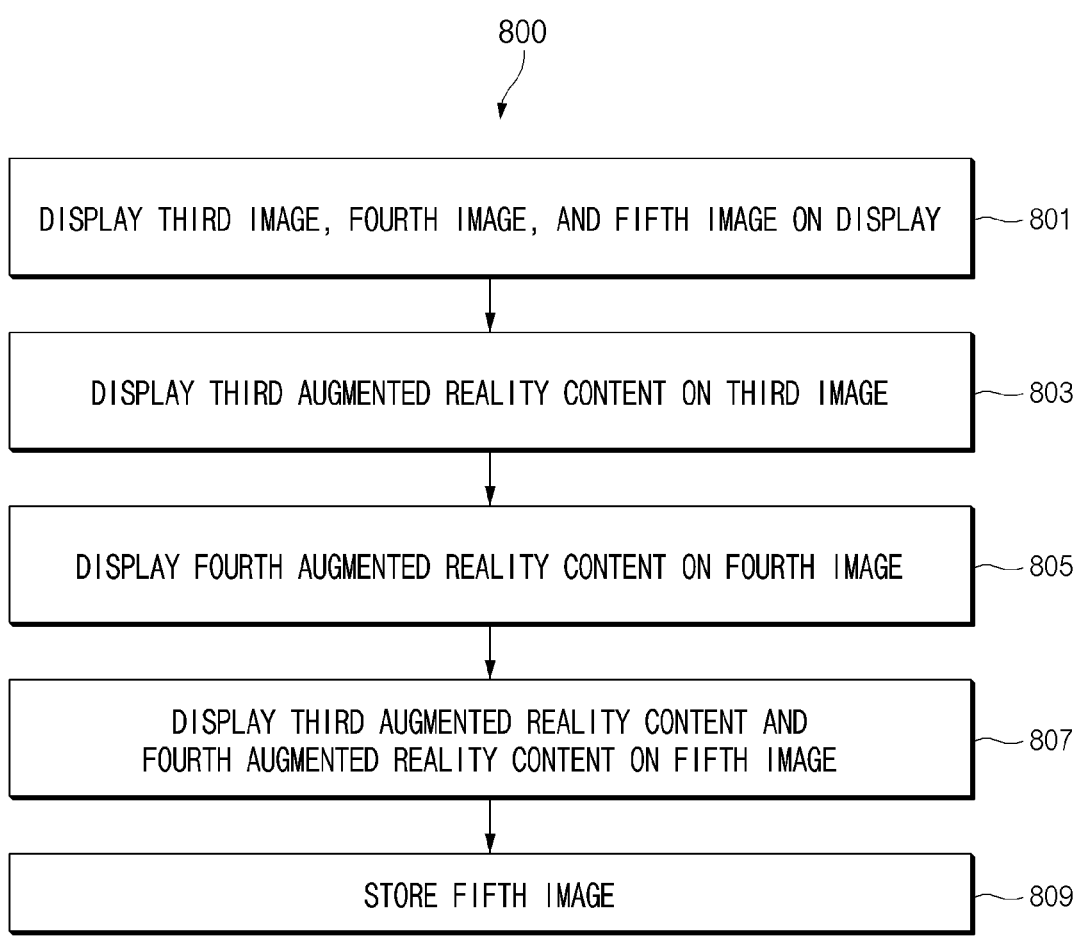
FIG. 8 is a flowchart illustrating an operation of an electronic device according to an embodiment of the disclosure.

FIG. 8 is a flowchart illustrating an operation of an electronic device according to an embodiment of the disclosure. Operations of the electronic device, which will be described below, may be performed by an electronic device 201 of FIG. 2 or a processor 250 of the electronic device 201.

According to an embodiment, the electronic device may execute a camera application, thus performing a process shown in FIG. 8. According to an embodiment, the electronic device may include a first camera (e.g., a camera 210 of FIG. 2) (e.g., a front camera) disposed towards the same direction as a direction where a display area of a display (e.g., a display 230 of FIG. 2) is exposed and a second camera (e.g., the camera 210 of FIG. 2) (e.g., a rear camera) disposed towards a direction opposite to the direction of the first camera. According to an embodiment, as the camera application is executed, the electronic device may obtain a third image using the first camera and may obtain a fourth image using the second camera. According to an embodiment, the third image and the fourth time may include preview images.

According to an embodiment, the electronic device may synthesize the third image and the fourth image to obtain a fifth image. According to an embodiment, the third image may include a body part of a user. The electronic device may separate the body part of the user from a background from the third image and may synthesize the body part of the user with the fourth image. For example, the electronic device extracts a body part of the user from the third image along a border line between the background and the body part of the user. The electronic device may synthesize the extracted body part of the user at a specified location of the fourth image at a specified size.

The case where the third image is the image where the user is captured is exemplified in the above-mentioned embodiment, but not limited thereto. The fourth image is an image where the user is captured, and a body part of the user separated from the fourth image may be synthesized with the third image as a background.

According to an embodiment, the electronic device may recognize a virtual space corresponding to the fifth image based on one three-dimensional coordinate system. According to an embodiment, the electronic device may map information corresponding to specific coordinates of the third image to at least some of coordinates of the fifth image and may map information corresponding to specific coordinates of the fourth image to the rest of the coordinates of the fifth image. For example, the specific coordinates of the third image includes coordinates corresponding to the body part of the user included in the third image.

Referring to FIG. 8, in a method 800, in operation 801, the electronic device may display the third image, the fourth image, and the fifth image on its display. According to an embodiment, the electronic device may divide a screen to display the third image, the fourth image, and the fifth image at the same time, but not limited thereto.

In operation 803, the electronic device may display third augmented reality content on the third image. According to an embodiment, the electronic device may receive a user input through a touch panel (e.g., a touch panel 220 of FIG. 2) and may display the third augmented reality content on the third image based on the user input. For example, the user input includes a touch input using a finger of the user or a stylus pen, which is detected through the touch panel by the electronic device. According to an embodiment, the electronic device may generate the third augmented reality content based on the user input which is input on an area of the display where the third image is displayed.

According to an embodiment, the electronic device may display the generated third augmented reality content at a specific location of the third image. The location where the third augmented reality content is displayed may be determined based on a location where the electronic device detects a user input for generating the third augmented reality content using the touch panel. For example, the third augmented reality content is displayed on a specific body part of the user included in the third image, but not limited thereto.

In operation 805, the electronic device may display fourth augmented reality content on the fourth image. According to an embodiment, the electronic device may display the fourth augmented reality content on the fourth image based on the user input through the touch panel. The electronic device may generate the fourth augmented reality content based on the user input which is input on an area of the display where the fourth image is displayed.

According to an embodiment, the electronic device may display the generated fourth augmented reality content at a specific location of the fourth image. The location where the fourth augmented reality content is displayed may be determined based on a location where the electronic device detects a user input for generating the fourth augmented reality content using the touch panel. For example, the fourth augmented reality content is fixed and displayed on specific coordinates of a virtual space constructed based on the fourth image, but not limited thereto.

In operation 807, the electronic device may display the third augmented reality content and the fourth augmented reality content on the fifth image. According to an embodiment, as the third augmented reality content is displayed on the third image, the electronic device may display the third augmented reality content at a corresponding location of the third image included in the fifth image. For example, the electronic device identifies a body part of the user where third augmented reality content is displayed on the third image and displays the third augmented reality content at a location of the identified body part of the user on the fifth image. The electronic device may identify the body part of the user, which is identified that the third augmented reality content is displayed on the third image, from the fifth image and may display the third augmented reality content on the identified body part of the user on the fifth image.

According to an embodiment, as the fourth augmented reality content is displayed on the fourth image, the electronic device may display the fourth augmented reality content at a corresponding location of the fourth image included in the fifth image. For example, the electronic device displays the fourth augmented reality content at a location on the fifth image, which corresponds to the location where the fourth augmented reality content is displayed on the fourth image.

In operation 809, the electronic device may store the fifth image. According to an embodiment, the fifth image where the third image and the fourth image, which are preview images, are synthesized with each other may include a preview image. According to an embodiment, the electronic device may receive a user input to which an operation of storing a real-time image obtained by a camera is mapped, thus storing the fifth image. The user input may include, for example, a touch input for touching a capture button (or a save button) displayed on the display. The electronic device may receive a user input corresponding to a capture command or a save command, thus storing the fifth image displayed on the display in a memory (e.g., a memory 260 of FIG. 2).

According to the embodiment described above with reference to FIG. 8, the electronic device may generate and display augmented reality content for each of images captured by a plurality of cameras, may display augmented reality content displayed on each of the plurality of images at a corresponding location of an image where the plurality of images are synthesized with one another, and may store such a synthesized image.

The case where the electronic device synthesizes the plurality of images captured by the plurality of cameras included in the same electronic device is exemplified in the above-mentioned embodiment, but not limited thereto. The process of FIG. 8 may be applied to even the case where the electronic device synthesizes a plurality of images captured by cameras of different electronic devices in the same or similar manner.

Hereinafter, a description will be given of a user interface where the electronic device generates augmented reality content for each of the plurality of images obtained by the plurality of cameras and provides an image where the plurality of images where the pieces of augmented reality content are displayed are synthesized with one another.

Figure 9:
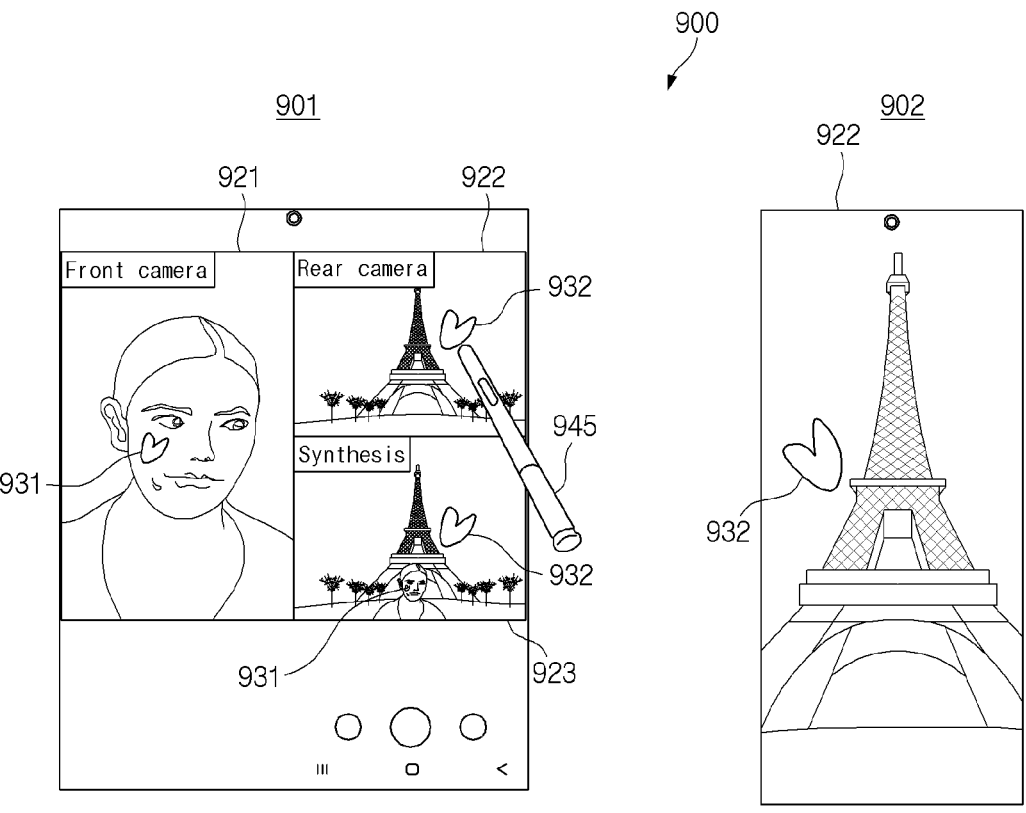
FIG. 9 is a drawing illustrating a user interface provided by an electronic device according to an embodiment of the disclosure.

FIG. 9 is a drawing 900 illustrating user interfaces provided by an electronic device and an external electronic device according to an embodiment of the disclosure. Operations of the electronic device, which will be described below, may be performed by an electronic device 201 of FIG. 2 or a processor 250 of the electronic device 201.

A display (e.g., a display 230 of FIG. 2) of the electronic device shown in FIG. 9 may include a first display disposed towards a first direction and a second display disposed towards a direction opposite to the first direction. A camera (e.g., a camera 210 of FIG. 2) of the electronic device may include a first camera disposed towards the first direction and a second camera disposed towards a second direction. Hereinafter, the first camera may be referred to as a front camera, and the second camera may be referred to as a rear camera.

Referring to FIG. 9, in a drawing 900, a first user interface 901 shown in FIG. 9 may include a user interface displayed on a first display by the electronic device, and a second user interface 902 may include a user interface displayed on a second display by the electronic device.

According to an embodiment, the first user interface 901 may include a third image 921 obtained by the first camera, a fourth image 922 obtained by the second camera, and a fifth image 923 where the third image 921 and the fourth image 922 are synthesized with each other.

According to an embodiment, the third image 921 may include a portion (e.g., a face) of the body part of a user. The electronic device may separate a portion of the body part of the user from the background of the third image 921 along a border line and may synthesize the portion of the body part of the user with the fourth image 922 to obtain the fifth image 923.

According to an embodiment, the electronic device may map at least a portion of the third image 921 to at least some of coordinates corresponding to the fifth image 923 and may map at least a portion of the fourth image 922 to the rest of the coordinates corresponding to the fifth image 923. According to an embodiment, the fifth image 923 may include at least a portion of the third image 921 and at least a portion of the fourth image 922.

According to an embodiment, the electronic device may generate augmented reality content based on a user input on at least one of the third image 921 or the fourth image 922 and may display the augmented reality content on the third image 921 or the fourth image 922. According to an embodiment, the user input for generating the augmented reality content may include a touch input using a finger of the user or a stylus pen. The electronic device may detect the user input through a touch panel (e.g., a touch panel 220 of FIG. 2). Because the method for generating the augmented reality content based on the touch input in the electronic device is described above, a duplicated description will be omitted.

For example, when the user draws a heart on the third image 921 using a stylus pen 945, the electronic device generates and display third augmented reality content 931 in the shape of the heart on the third image 921. When the user draws a heart on the fourth image 922 using the stylus pen 945, the electronic device may generate and display fourth augmented reality content 932 in the shape of the heart on the fourth image 922.

According to an embodiment, the electronic device may display the third augmented reality content 931 on the fifth image 923 based on a location where the third augmented reality content 931 is displayed on the third image 921 and may display the fourth augmented reality content 932 on the fifth image 923 based on a location where the fourth augmented reality content 932 is displayed on the fourth image 922.

According to an embodiment, the location where the third augmented reality content 931 is displayed on the third image 921 may include body part information of the user or coordinate information. According to an embodiment, the electronic device may identify a body part of the user where the third augmented reality content 931 is displayed on the third image 921 and may display the third augmented reality content 931 at a location of the identified body part on the fifth image 923. For example, the electronic device identifies a body part of the user where the third augmented reality content 931 is displayed on the third image 921 as a right cheek, thus displaying the third augmented reality content 931 at a location displayed on the right cheek of the user on the fifth image 923.

According to an embodiment, the electronic device may display the third augmented reality content 931 at a coordinate location on the fifth image 923 to which coordinates where the third augmented reality content 931 is displayed on the third image 921 are mapped.

According to an embodiment, the location where the fourth augmented reality content 932 is displayed on the fourth image 922 may include coordinate information. According to an embodiment, the electronic device may display the fourth augmented reality content 932 at a coordinate location on the fifth image 923 to which coordinates where the fourth augmented reality content 932 is displayed on the fourth image 922 are mapped.

According to an embodiment, the electronic device may synthesize the third image 921 and the fourth image 922 to obtain the fifth image 923 and may display the third augmented reality content 931 and the fourth augmented reality content 932 on the fifth image 923 to provide various user experiences.

According to an embodiment, the second user interface 902 may include, but is not limited to, the fourth image 922 obtained by the second camera. According to an embodiment, the electronic device may control the second user interface 902 in conjunction with the first user interface 901. According to an embodiment, the electronic device may receive a user input for generating the fourth augmented reality content 932 on the fourth image 922 through the first user interface 901, thus displaying the fourth augmented reality content 932 on the fourth image 922 provided through the second user interface 902.

According to an embodiment, the electronic device may further provide the second user interface 902 using a second display to provide the user who is looking at the second display with a preview image of an image captured by the camera.

Hereinafter, a description will be given of a user interface where the electronic device according to an embodiment controls the display of augmented reality content on an image where images captured by the plurality of cameras are synthesized with one another based on user interaction with reference to FIG. 10.

Figure 10:
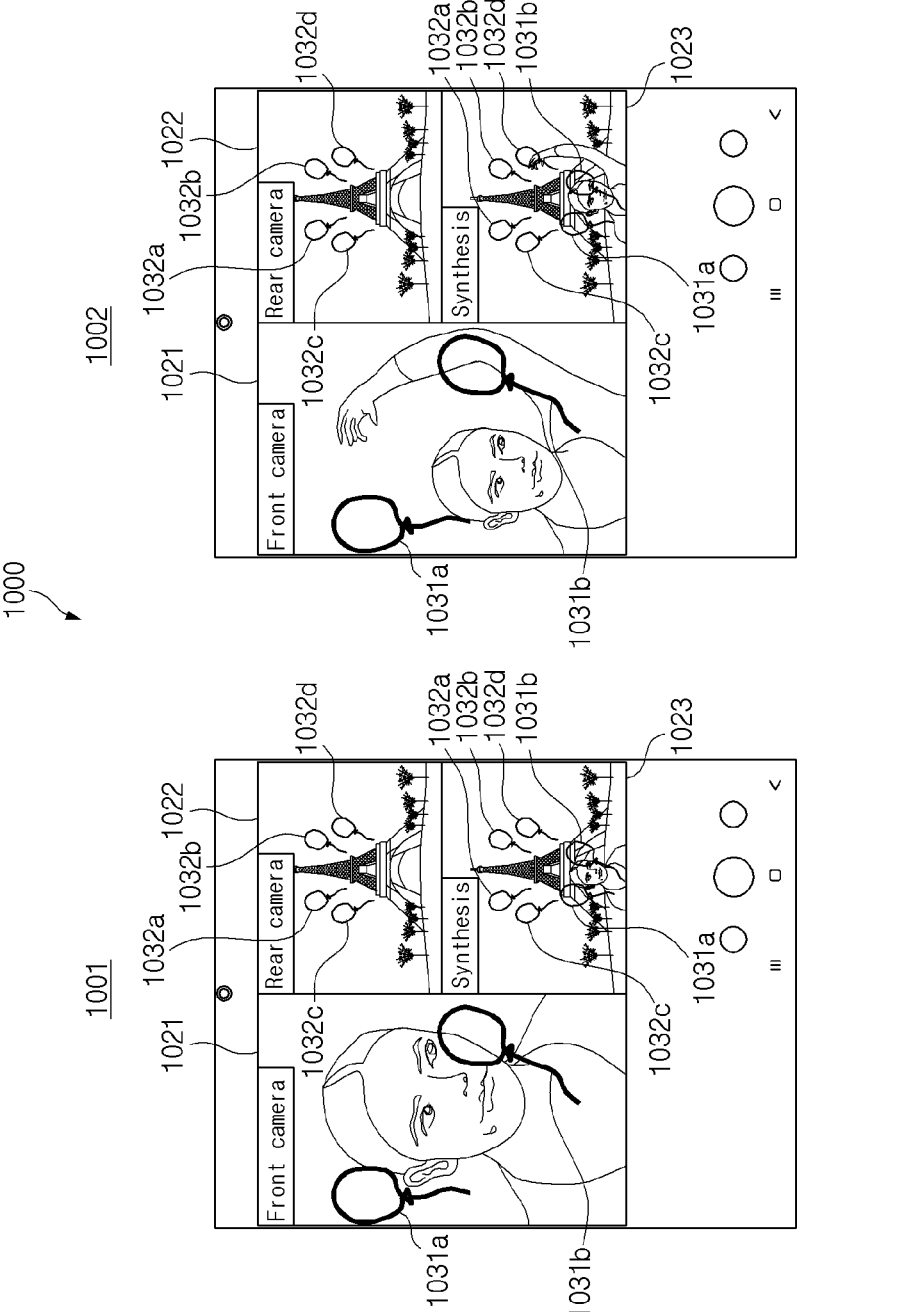
FIG. 10 is a drawing illustrating a user interface provided by an electronic device according to an embodiment of the disclosure.

FIG. 10 is a drawing illustrating a user interface provided by an electronic device according to an embodiment of the disclosure. Operations of the electronic device, which will be described below, may be performed by an electronic device 201 of FIG. 2 or a processor 250 of the electronic device 201.

Referring to FIG. 10, in a drawing 1000, a camera (e.g., a camera 210 of FIG. 2) of an electronic device shown in FIG. 10 may include a first camera disposed towards the same direction as a direction where a display area of a display (e.g., a display 230 of FIG. 2) is exposed and a second camera disposed towards a direction opposite to the direction of the first camera. Hereinafter, the first camera may be referred to as a front camera, and the second camera may be referred to as a rear camera.

According to an embodiment, as a camera application is executed based on a user input, the electronic device may display a first user interface 1001 on its display. According to an embodiment, the first user interface 1001 may include a third image 1021 obtained by the first camera, a fourth image 1022 obtained by the second camera, and a fifth image 1023 where the third image 1021 and the fourth image 1022 are synthesized with each other. Because the third image 1021, the fourth image 1022, and the fifth image 1023 are described above with reference to FIG. 9, a duplicated description will be brief or omitted.

According to an embodiment, the electronic device may generate augmented reality content based on a user input on at least one of the third image 1021 or the fourth image 1022 and may display the augmented reality content on the third image 1021 or the fourth image 1022. According to an embodiment, because the method for generating the augmented reality content based on the user input in the electronic device is described above, a duplicated description will be omitted.

For example, when the user draws a balloon on the third image 1021 using a stylus pen, the electronic device generates and display pieces of third augmented reality content 1031a and 1031b in the shape of the balloon on the third image 1021. When the user draws a balloon on the fourth image 1022 using the stylus pen, the electronic device may generate and display pieces of fourth augmented reality content 1032a, 1032b, 1032c, and 1032d in the shape of the balloon on the fourth image 1022.

According to an embodiment, the electronic device may identify a location of the third augmented reality content 1031a or 1031b on the third image 1021 based on a three-dimensional coordinate system of a virtual space implemented based on the third image 1021. The electronic device may identify a location of the fourth augmented reality content 1032a, 1032b, 1032c, or 1032d on the fourth image 1022 based on a three-dimensional coordinate system of a virtual space implemented based on the fourth image 1022.

According to an embodiment, the electronic device may display the third augmented reality content 1031a or 1031b on the fifth image 1032 based on the location where the third augmented reality content 1031a or 1031b is displayed on the third image 1021 and may display the fourth augmented reality content 1032a, 1032b, 1032c, or 1032d on the fifth image 1023 based on the location where the fourth augmented reality content 1032a, 1032b, 1032c, or 1032d is displayed on the fourth image 1022.

According to an embodiment, the electronic device may synthesize the third image 1021 and the fourth image 1022 to generate the fifth image 1023, thus merging a coordinate system for the third image 1021 and a coordinate system for the fourth image 1022 into one coordinate system. According to an embodiment, coordinates according to the coordinate system for the third image 1021 and coordinates according to the coordinate system for the fourth image 1022 may correspond one-to-one to coordinates according to a coordinate system for the fifth image 1023.

According to an embodiment, the electronic device may display the third augmented reality content 1031a or 1031b at a coordinate location on the fifth image 1023, which corresponds to coordinates where the third augmented reality content 1031a or 1031b is displayed on the third image, and may display the fourth augmented reality content 1032a, 1032b, 1032c, or 1032d at a coordinate location on the fifth image, which corresponds to coordinates where the fourth augmented reality content 1032a, 1032b, 1032c, or 1032d is displayed on the fourth image 1022.

According to an embodiment, the electronic device may display the second user interface 1002 for changing the display of augmented reality content on the fifth image 1023 based on user interaction on the display.

According to an embodiment, the electronic device may recognize a specified body part of a user from the third image 1021 or the fourth image 1022. According to an embodiment, the specified body part may be a body part of the user used for user interaction for controlling the display of augmented reality content, which may include, for example, a hand. According to the second user interface 1002, the electronic device may recognize a hand of the user from the third image 1021.

According to an embodiment, the user interaction may include a gesture where the user moves the specified body part such that the specified body part touches augmented reality content on a virtual space implemented based on the fifth image 1023. According to the second user interface 1002, the electronic device may receive user interaction where the user moves his or her hand to touch the third augmented reality content 1031a or 1031b or the fourth augmented reality content 1032a, 1032b, 1032c, or 1032d.

According to an embodiment, the electronic device may change a location of the third augmented reality content 1031a or 1031b or the fourth augmented reality content 1032a, 1032b, 1032c, or 1032d based on the user interaction or may display an animation effect of the third augmented reality content 1031a or 1031b or the fourth augmented reality content 1032a, 1032b, 1032c, or 1032d.

For example, according to the second user interface 1002, the electronic device receives user interaction where the user extends his or her hand to touch the fourth augmented reality content 1032d and then extends his or her hand to another location, thus changing a location of the fourth augmented reality content 1032d.

As another example, the electronic device receives user interaction where the user extends his or her hand to tap the third augmented reality content 1031a or 1031b or the fourth augmented reality content 1032a, 1032b, 1032c, or 1032d, thus displaying an animation effect for exploding the third augmented reality content 1031a or 1031b or the fourth augmented reality content 1032a, 1032b, 1032c, or 1032d, but not limited thereto. The electronic device may display various animation effects depending on user interaction and may display another animation effect depending on a virtual object included in augmented reality content.

According to an embodiment, the electronic device may synthesize images obtained by a plurality of cameras and may display augmented reality content generated for each image on the synthesized image based on one coordinate system to provide pieces of separately generated augmented reality content in one space in a connected manner. Furthermore, the electronic device may change a location of the augmented reality content based on the user interaction or may display an animation effect of the augmented reality content to provide various user experiences.

Hereinafter, a description will be given of a user interface for generating augmented reality content in an electronic device according to an embodiment with reference to FIG. 11.

Figure 11:
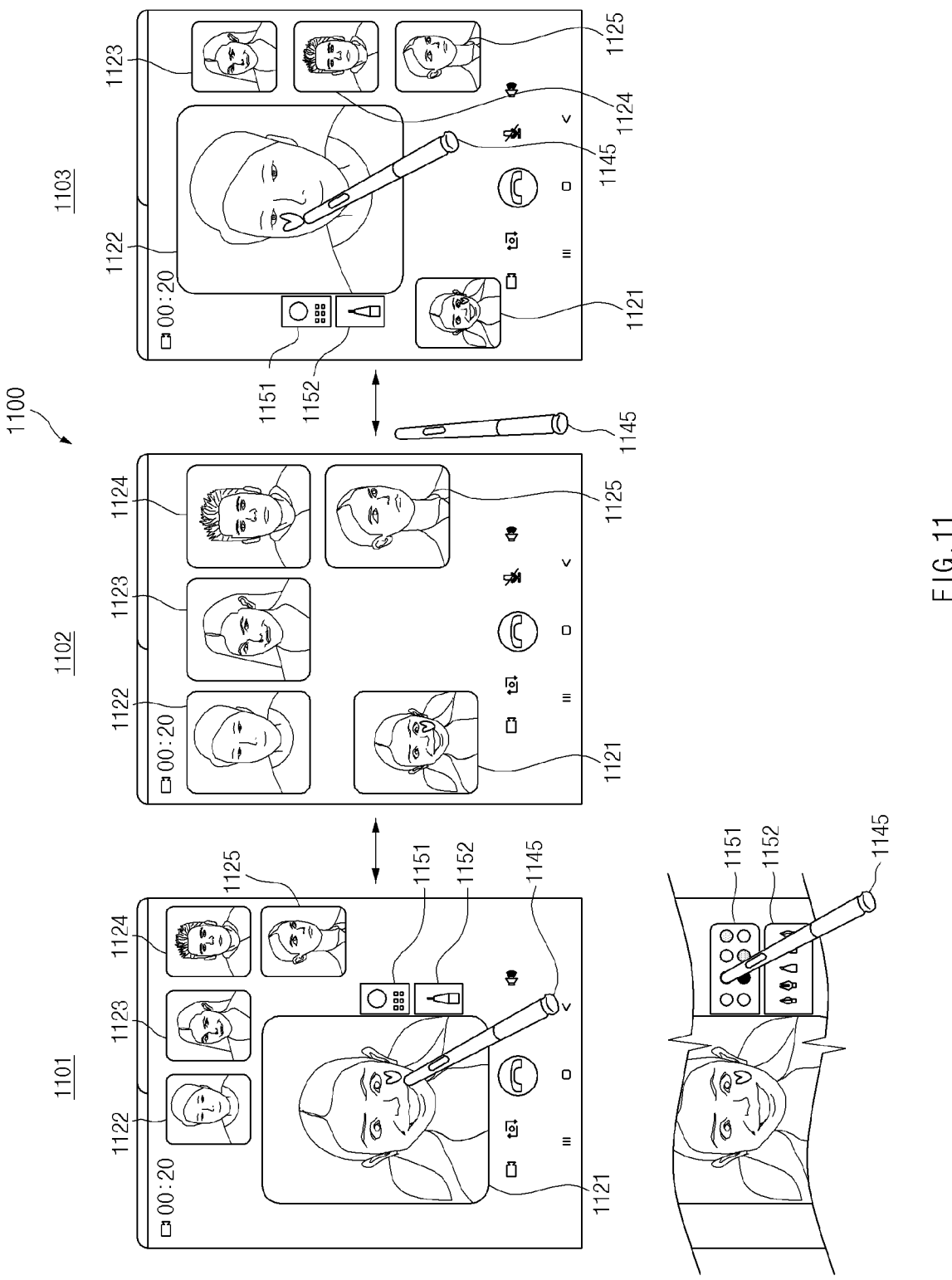
FIG. 11 is a drawing illustrating a user interface provided by an electronic device according to an embodiment of the disclosure.

FIG. 11 is a drawing illustrating a user interface provided by an electronic device according to an embodiment of the disclosure. Operations of the electronic device, which will be described below, may be performed by an electronic device 201 of FIG. 2 or a processor 250 of the electronic device 201.

Referring to FIG. 11, in a drawing 1100, the electronic device may include a sensor module (e.g., a sensor module 176 of FIG. 1) which senses proximity of a body part (e.g., a fingertip) of a user or a stylus pen 1145 to a display (e.g., a display 230 of FIG. 2). The sensor module may include, for example, a proximity sensor or a touch sensor. The electronic device may detect occurrence of a proximity event or a touch event of the body part of the user or the stylus pen 1145 to the display using the sensor module.

According to an embodiment, the electronic device may activate and display a user interface for generating augmented reality content on the display based on an input using the body part of the user or the stylus pen 1145, based on the sensed result of the sensor module.

Referring to the first user interface 1101, the electronic device may detect the proximity event or the touch event of the stylus pen 1145 using the sensor module, thus activating a user interface for generating augmented reality content. According to an embodiment, the user interface for generating the augmented reality content may include a color selection element 1151 and a virtual pen selection element 1152.

According to an embodiment, the electronic device may unfold and display a color palette by receiving an input for touching the color selection element 1151 through the touch panel and may determine a color of augmented reality content by receiving a touch input for selecting one color on the color palette.

According to an embodiment, the electronic device may unfold and display a collection of pens by receiving an input for touching the virtual pen selection element 1152 through the touch panel and may determine a line type (e.g., a shape or a thickness) of augmented reality content by receiving a touch input for selecting one pen type on the collection of pens.

According to an embodiment, when the electronic device makes a video call connection with an external electronic device, it may display a first image 1121 captured by a camera of the electronic device and a second image 1122, a third image 1123, a fourth image 1124, and a fifth image 1125 received from the external electronic device. According to an embodiment, the electronic device may activate a user interface for generating augmented reality content, thus enlarging and displaying one of the first image 1121, the second image 1122, the third image 1123, the fourth image 1124, or the fifth image 1125 and displaying the color selection element 1151 and the virtual pen selection element 1152 at one side of the enlarged image.

According to an embodiment, the electronic device may generate augmented reality content according to the color and the line shape determined through the color selection element 1151 and the virtual pen selection element 1152, in response to a touch input using the stylus pen 1145 through the touch panel corresponding to an area where the enlarged image (e.g., the first image 1121) is displayed on the touch panel.

Referring to a second user interface 1102, the electronic device may deactivate a user interface for generating augmented reality content in a state where the proximity event or the touch event of the stylus pen 1145 is not detected. For example, in the state where the user interface for generating the augmented reality content is deactivated, the electronic device displays the first image 1121, the second image 1122, the third image 1123, the fourth image 1124, and the fifth image 1125 at the same size and fails to display the color selection element 1151 and the virtual pen selection element 1152.

According to an embodiment, the electronic device may receive an image selection input using the stylus pen 1145 through the touch panel, thus displaying a third user interface 1103 on the display. According to an embodiment, the image selection input may include an input where the user touches one of the first image 1121, the second image 1122, the third image 1123, the fourth image 1124, or the fifth image 1125 using the stylus pen 1145.

For example, the electronic device receives the user input for touching the second image 1122, thus displaying the third user interface 1103 on the display. Referring to the third user interface 1103, the electronic device may enlarge and display the second image 1122 and may display the color selection element 1151 and the virtual pen selection element 1152 at one side of the second image 1122.

The case where the electronic device activates the user interface for generating the augmented reality content based on whether the body part of the user or the stylus pen 1145 is close to the display is exemplified in the above-mentioned embodiment, but not limited thereto. The electronic device may control activation of a user interface for generating augmented reality content based on whether the stylus pen 1145 is mounted and demounted. For example, the electronic device may include a sensor capable of sensing mounting and demounting of the stylus pen 1145, may activate a user interface for generating augmented reality content by sensing the demounting of the stylus pen 1145 using the sensor, and may deactivate the user interface for generating the augmented reality content by sensing the mounting of the stylus pen 1145.

Hereinafter, a description will be given of a method for adding and display pieces of augmented reality content generated by different users in an electronic device according to an embodiment with reference to FIG. 12.

Figure 12:
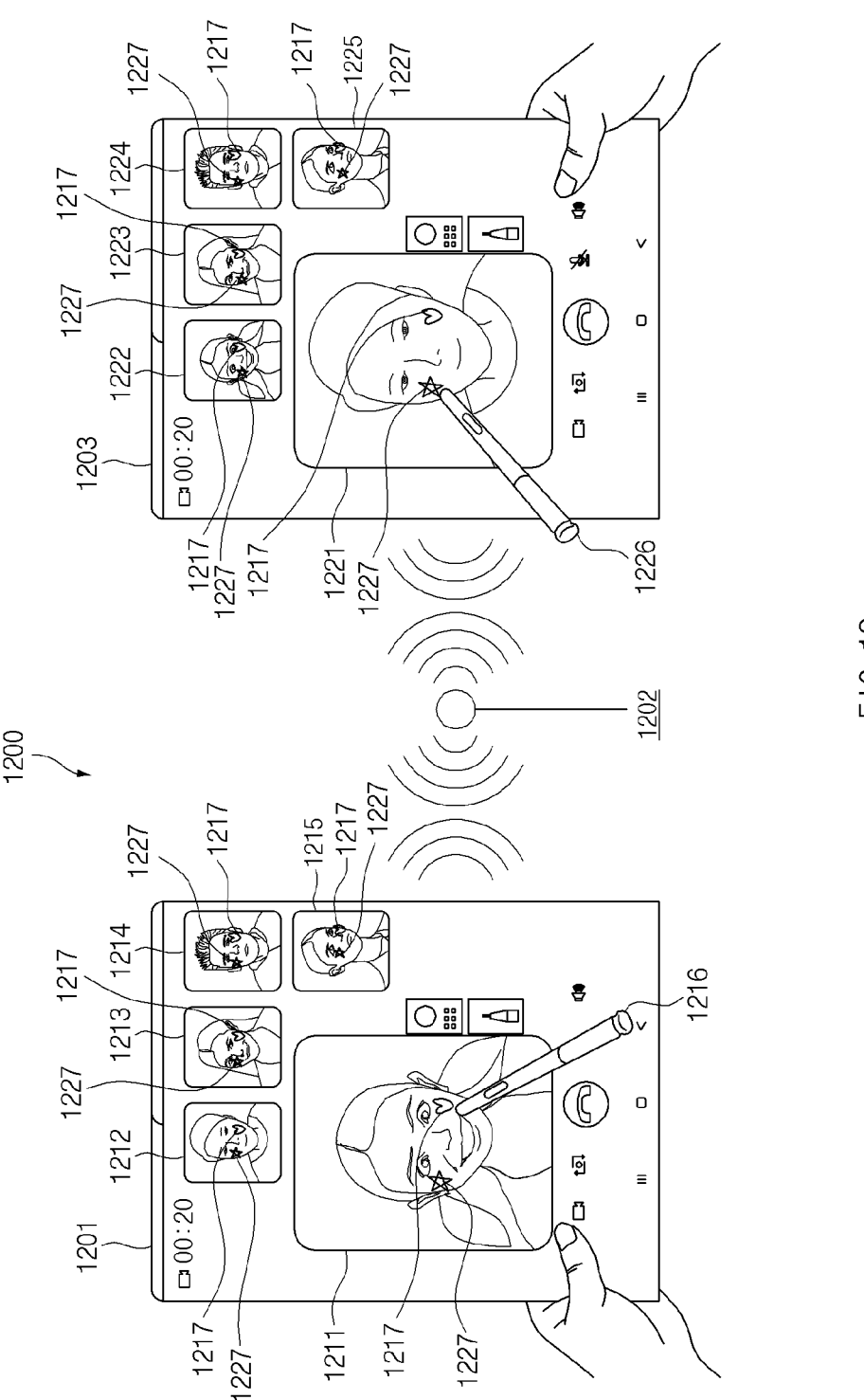
FIG. 12 is a drawing illustrating user interfaces provided by an electronic device and an external electronic device according to an embodiment of the disclosure.

FIG. 12 is a drawing illustrating user interfaces provided by an electronic device and an external electronic device according to an embodiment of the disclosure. Operations of the electronic device, which will be described below, may be performed by an electronic device 201 of FIG. 2 or a processor 250 of the electronic device 201.

According to an embodiment, an electronic device 1201 and a first external electronic device 1203 may communicate with each other over a network 1202. The electronic device 1201 may perform a video call with the first external electronic device 1203 based on the network 1202. Only one external electronic device (first external electronic device 1203) is illustrated in FIG. 12, but the electronic device 1201 may communicate with a plurality of external electronic devices to provide a multi-party video call service.

Referring to FIG. 12, in a drawing 1200, the electronic device 1201 may perform a video call with the plurality of external electronic devices. According to an embodiment, the electronic device 1201 may display a first image 1211 captured by a camera (e.g., a camera 210 of FIG. 2), a second image 1212 received from the first external electronic device 1203, a third image 1213 received from a second external electronic device, a fourth image 1214 received from a third external electronic device, and a fifth image 1215 received from a fourth external electronic device on a display (e.g., a display 230 of FIG. 2).

According to an embodiment, the electronic device 1201 may generate first augmented reality content 1217 based on a touch input using a stylus pen 1216 of a user, which is detected through a touch panel (e.g., a touch panel 220 of FIG. 2). For example, as a user provides an input on a display area where the first image 1211 is displayed, the electronic device 1201 maps first augmented reality content 1217 to a specific location on the first image 1211 and displays the first augmented reality content 1217 on the first image 1211.

According to an embodiment, the electronic device 1201 may identify a body part of the user where the first augmented reality content 1217 is displayed on the first image 1211. For example, the first to fifth images 1211 to 1215 includes a face of a user of the electronic device or the external electronic device. In the embodiment shown in FIG. 12, the electronic device 1201 may identify that the first augmented reality content 1217 in the shape of a heart is displayed on a left cheek of the user.

According to an embodiment, the electronic device 1201 may display the first augmented reality content 1217 at a corresponding location of an image except for the first image 1211 among a plurality of images based on the body part of the user where the first augmented reality content 1217 identified from the first image 1211 is displayed. For example, the electronic device 1201 identifies that the first augmented reality content 1217 is displayed on the left cheek of the user, thus displaying the first augmented reality content 1217 on the left cheek of each user identified from each of the second image 1212, the third image 1213, the fourth image 1214, and the fifth image 1215.

According to an embodiment, the electronic device 1201 may transmit the first augmented reality content 1217 to an external electronic device (e.g., the first external electronic device 1203) connected over the network. The electronic device 1201 may transmit location information where the first augmented reality content 1217 is displayed on the first image 1211 to the external electronic device (e.g., the first external electronic device 1203). The location information where the first augmented reality content 1217 is displayed on the first image 1211 may include, for example, body part information of the user where the first augmented reality content 1217 is displayed on the first image 1211.

According to an embodiment, the first external electronic device 1203 may display the first augmented reality content 1217 transmitted from the electronic device 1201 on the first to fifth images 1221 to 1225 displayed on a display of the first external electronic device 1203 based on the location information. According to the embodiment shown in FIG. 12, the first external electronic device 1203 may display the first augmented reality content 1217 on a left cheek of each user identified from each of the first to fifth images 1221 to 1225.

According to an embodiment, the first external electronic device 1203 may display a first image 1221 captured by a camera, a second image 1222 received from the electronic device 1201, a third image 1223 received from a second external electronic device, a fourth image 1224 received from a third external electronic device, and a fifth image 1225 received from a fourth external electronic device on its display.

According to an embodiment, the first external electronic device 1203 may generate second augmented reality content 1227 based on a touch input using a stylus pen 1226 of a user of the first external electronic device 1203, which is detected using the touch panel. For example, as the user provides an input on a display area where the first image 1221 is displayed, the first external electronic device 1203 maps the second augmented reality content 1227 to a specific location on the first image 1221 and displays the second augmented reality content 1227 on the first image 1221.

According to an embodiment, the first external electronic device 1203 may identify a body part of the user where the second augmented reality content 1227 is displayed on the first image 1221. In the embodiment shown in FIG. 12, the first external electronic device 1203 may identify that the second augmented reality content 1227 in the shape of a star is displayed on a right cheek of the user.

According to an embodiment, the first external electronic device 1203 may transmit the second augmented reality content 1227 to the electronic device 1201 connected over the network. The first external electronic device 1203 may transmit location information where the second augmented reality content 1227 is displayed on the first image 1211 to the electronic device 1201. The location information of the second augmented reality content 1227, which is received by the electronic device 1201, may include, for example, body part information of the user where the second augmented reality content 1227 is displayed on the first image 1221.

According to an embodiment, the electronic device 1201 may display the second augmented reality content 1227 on the first to fifth images 1211 to 1215 based on the location information of the second augmented reality content 1227. For example, the electronic device 1201 receives the location information that the second augmented reality content 1227 is displayed on the right cheek of the user, thus displaying the second augmented reality content 1227 on the right cheek of each user identified from each of the first to fifth images 1211 to 1215.

According to an embodiment, the electronic device 1201 may add and display the first augmented reality content 1217 generated by the user of the electronic device 1201 and the second augmented reality content 1227 generated by the user of the first external electronic device 1203 to each of a plurality of images. For the first to fifth images 1211 to 1215, the electronic device 1201 may display the first augmented reality content 1217 on a body part corresponding to the location information of the first augmented reality content 1217 among body parts of the user included in each image and may display the second augmented reality content 1227 on the body part corresponding to the location information of the second augmented reality content 1227.

According to an embodiment, the electronic device 1201 may display the first augmented reality content 1217 generated by the user of the electronic device 1201 and the second augmented reality content 1227 received from the first external electronic device 1203 in different colors to separately display pieces of augmented reality content generated by different users.

According to the above, the first external electronic device 1203 may display the second augmented reality content 1227 at a corresponding location of images (e.g., the second image 1222, the third image 1223, the fourth image 1224, and the fifth image 1225) except for the first image 1221 among the plurality of images based on the location information of the second augmented reality content 1227, which is identified from the first image 1221, and may display the first augmented reality content 1217 received from the electronic device 1201 at corresponding locations of the plurality of images (e.g., the first image 1221, the second image 1222, the third image 1223, the fourth image 1224, and the fifth image 1225) based on the location information.

Hereinafter, a description will be given of a method for providing a user interface associated with generating augmented reality content depending on a size of a display when the electronic device according to an embodiment includes a flexible display with reference to FIG. 13.

Figure 13:
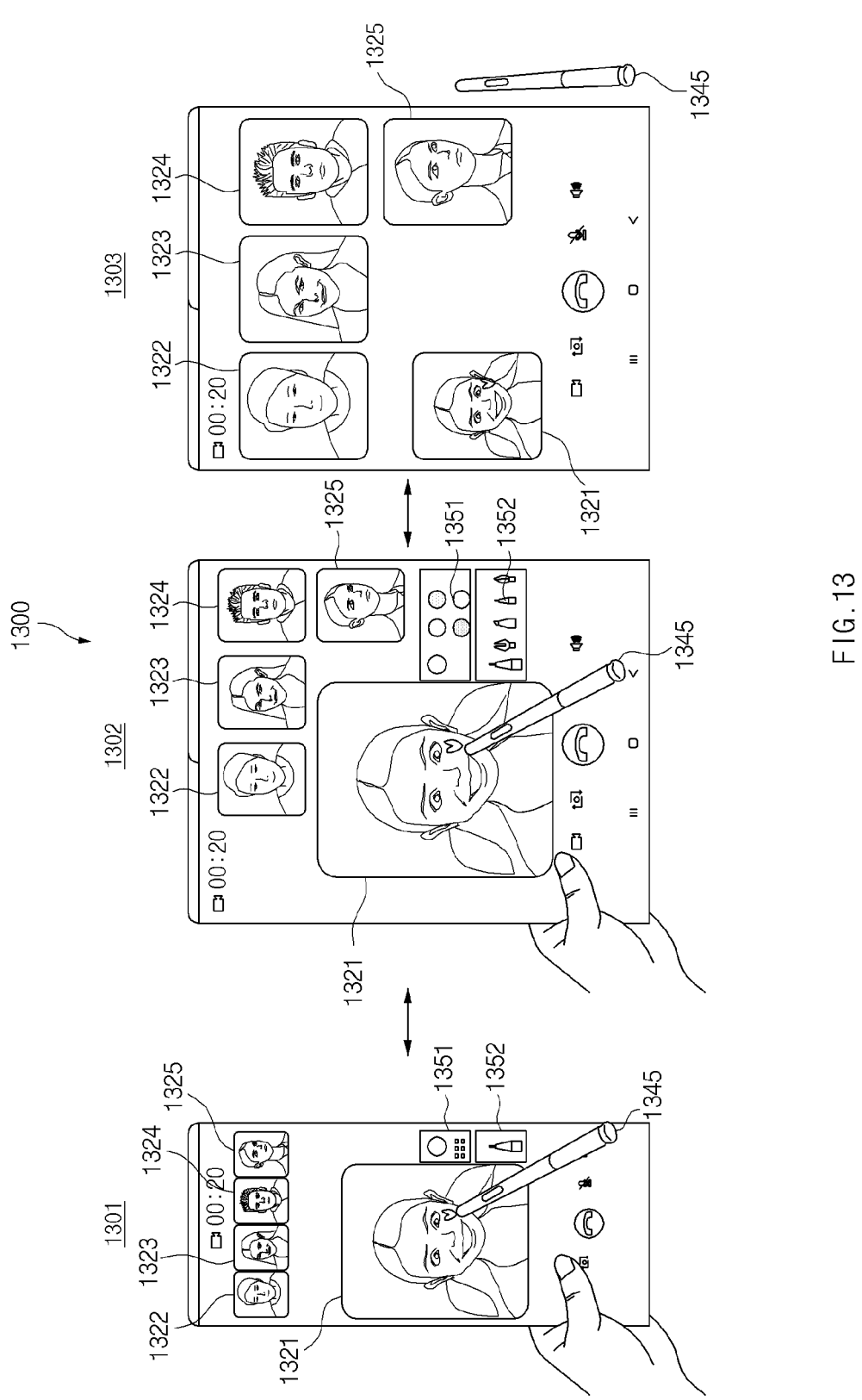
FIG. 13 is a drawing illustrating a user interface provided by an electronic device according to an embodiment of the disclosure.

FIG. 13 is a drawing illustrating a user interface provided by an electronic device according to an embodiment of the disclosure. Operations of the electronic device, which will be described below, may be performed by an electronic device 201 of FIG. 2 or a processor 250 of the electronic device 201.

A display (e.g., a display 230 of FIG. 2) of the electronic device according to an embodiment, which is shown in FIG. 13, may include a flexible display. The flexible display may change in display size by, for example, a folding/unfolding operation or may change in display size by a rolling or sliding operation. According to an embodiment, the electronic device may detect a change in display size using a sensor module (e.g., a sensor module 176 of FIG. 1). The sensor module may sense a change in display size by sensing a folding, unfolding, rolling, or sliding operation of the display.

Referring to FIG. 13, in a drawing 1300, the electronic device may display a first user interface 1301 on the display as it is determined that the display size is less than a threshold and may display a second user interface 1302 or a third user interface 1303 on the display as it is determined that the display size is greater than or equal to the threshold.

For example, the electronic device includes a first display and a second display, which are arranged to face directions opposite to each other in a housing. When the second display is a foldable display, the electronic device may provide a user interface on the first display in a folding state and may provide a user interface on the second display in an unfolding state. According to an embodiment, the first display used in the folding state may be smaller than the second display used in the unfolding state. Thus, the electronic device may determine that the display decreases in size by sensing the folding operation using a sensor and may determine that the display increases in size by sensing the unfolding operation.

As another example, when the electronic device includes a rollable display, the electronic device provides a user interface on an enlarged screen in a rolling-out state and may provide a user interface on a reduced screen in a rolling-in state. The electronic device may determine that the display decreases in size by sensing the rolling-in operation using the sensor and may determine that the display increases in size by sensing the rolling-out operation.

According to an embodiment, as the video call is connected with a plurality of external electronic devices, the electronic device may display a first image 1321 captured by a camera (e.g., a camera 210 of FIG. 2) of the electronic device and a second image 1322, a third image 1323, a fourth image 1324, and a fifth image 1325 received from the plurality of external electronic devices on the display.

Referring to the first user interface 1301 and the second user interface 1302, the electronic device may increase sizes of the first to fifth images 1321 to 1325 as the display increases in size and may reduce the sizes of the first to fifth images 1321 to 1325 as the display decreases in size. According to an embodiment, the size of the image may refer to a size of a window where the image is displayed, which may include, for example, a horizontal length and a vertical length of the window or an area of the window. Furthermore, the electronic device may change the sizes of the first to fifth images 1325, thus changing layouts of the first to fifth images 1321 to 1325.

According to an embodiment, the electronic device may sense a proximity event or a touch event of a stylus pen 1345 to the display using the sensor, thus activating a user interface for generating augmented reality content. The user interface for generating the augmented reality content may include a color selection element 1351 and a virtual pen selection element 1352. Each element is described above with reference to FIG. 11, a duplicated description will be omitted.

Referring to the first user interface 1301 and the second user interface 1302, the electronic device may change at least one of a size and a layout of at least one element (e.g., the color selection element 1351 or the virtual pen selection element 1352) based on the change in display size. For example, the electronic device unfolds and displays a color palette of the color selection element 1351 and may and unfold and display a collection of pens of the virtual pen selection element 1352 as the display increases in size and may display the color selection element 1351 and the virtual pen selection element 1352 in a brief form as the display decreases in size.

According to an embodiment, when the stylus pen 1345 is away from the display in a state where the display size is greater than or equal to the threshold, the electronic device may display a third user interface 1303 on the display. According to the third user interface 1303, the electronic device may detect that the stylus pen 1345 is away from the display, thus deactivating a user interface for generating augmented reality content. For example, the electronic device ends the display of the color selection element 1351 and the virtual pen selection element 1352 and changes sizes and layouts of the first to fifth images 1321 to 1325.

According to the embodiment shown in FIG. 13, the electronic device may adjust a user interface to correspond to the size of the display to improve the user experience of the user in an augmented reality content providing environment of the electronic device including the display.

According to an embodiment disclosed in the disclosure, an electronic device (e.g., an electronic device 101 of FIG. 1, an electronic device 201 of FIG. 2, or an electronic device 1201 of FIG. 12) may include a camera (e.g., a camera module 180 of FIG. 1 or a camera 210 of FIG. 2), a touch panel (e.g., an input module 150 of FIG. 1 or a touch panel 220 of FIG. 2), a display (e.g., a display module 160 of FIG. 1 or a display 230 of FIG. 2), a communication circuit (e.g., a communication module 190 of FIG. 1 or a communication circuit 240 of FIG. 2), a processor (e.g., a processor 120 of FIG. 1 or a processor 250 of FIG. 2) operatively connected with the camera, the touch panel, the display, and the communication circuit, and a memory (e.g., a memory 130 of FIG. 1 or a memory 260 of FIG. 2) operatively connected with the processor. The memory may store one or more instructions, when executed, causing the processor to display a first image captured by the camera and a second image received from an external electronic device (e.g., an electronic device 104 of FIG. 1 or an external electronic device 203 of FIG. 2) through the communication circuit on the display, display first augmented reality content on the first image, display second augmented reality content on the second image, and display an animation effect of the first augmented reality content using the second augmented reality content based on a user input through the touch panel.

According to an embodiment disclosed in the disclosure, the first augmented reality content may be generated based on a user input of a first user being a user of the electronic device, and the second augmented reality content may be generated based on a user input of a second user being a user of the external electronic device and may be transmitted from the external electronic device through the communication circuit.

According to an embodiment disclosed in the disclosure, the user input of the first user or the user input of the second user may include an input using a stylus pen (e.g., a stylus pen 425 of FIGS. 4A and 4B, a stylus pen 645 of FIG. 6, a stylus pen 745 of FIG. 7, a stylus pen 945 of FIG. 9, a stylus pen 1145 of FIG. 11, a stylus pen 1216 or 1226 of FIG. 12, or a stylus pen 1345 of FIG. 13).

According to an embodiment disclosed in the disclosure, the instructions may cause the processor to identify at least one object included in the first augmented reality content and the second augmented reality content and display the animation effect corresponding to the identified at least one object among animation effects specified according to objects, in response to the user input.

According to an embodiment disclosed in the disclosure, the animation effect may include at least one animation effect for the same object. The instructions may cause the processor to display the animation effect corresponding to the user input among the at least one animation effect.

According to an embodiment disclosed in the disclosure, the first image may include a preview image obtained by the camera, and the second image may include a preview image obtained by a camera of the external electronic device.

According to an embodiment disclosed in the disclosure, the instructions may cause the processor to identify a body part of a first user where the first augmented reality content is displayed from the first image and display the first augmented reality content on a body part of a second user, the body part corresponding to the body part of the first user, on the second image.

According to an embodiment disclosed in the disclosure, the instructions may cause the processor to identify a body part of the second user where the second augmented reality content is displayed from the second image and display the second augmented reality content on a body part of the first user, the body part corresponding to the body part of the second user, on the first image.

According to an embodiment disclosed in the disclosure, the second augmented reality content may be generated based on a user input of a first user being a user of the electronic device. The instructions may cause the processor to transmit the second augmented reality content to the external electronic device through the communication circuit.

According to an embodiment disclosed in the disclosure, the camera may include a first camera disposed towards the same direction as a direction where a display area of the display is exposed and a second camera disposed towards a direction opposite to the direction of the first camera. The instructions may cause the processor to display a third image captured by the first camera, a fourth image captured by the second camera, and a fifth image in which the third image and the fourth image are synthesized with each other, display third augmented reality content on the fifth image as the third augmented reality content is displayed on the third image based on a user input through the touch panel and display fourth augmented reality content on the fifth image as the fourth augmented reality content is displayed on the fourth image based on a user input through the touch panel, and store the fifth image where at least one of the third augmented reality content or the fourth augmented reality content is displayed.

According to an embodiment disclosed in the disclosure, the instructions may cause the processor to recognize a specified body part of a user from the third image or the fourth image and change a location where the third augmented reality content or the fourth augmented reality content is displayed on the fifth image based on interaction using the specified body part or display an animation effect of the third augmented reality content or an animation effect of the fourth augmented reality content.

According to an embodiment disclosed in the disclosure, the electronic device may further include a sensor module (e.g., a sensor module 176 of FIG. 1). The instructions may cause the processor to sense proximity of a body part of a user or a stylus pen (e.g., a stylus pen 1145 of FIG. 11) to the display using the sensor module and activate and display a user interface for generating augmented reality content on the display based on an input using the body part of the user or the stylus pen, based on the sensed result of the sensor module.

According to an embodiment disclosed in the disclosure, the user interface may include a color selection element and a virtual pen selection element. The instructions may cause the processor to change at least one of a color or a line type of the augmented reality content based on a user input through the user interface.

According to an embodiment disclosed in the disclosure, the display may include a flexible display. The instructions may cause the processor to sense a change in display size using the sensor module and adjust the user interface to correspond to the display size.

According to an embodiment disclosed in the disclosure, the instructions may cause the processor to change a size or layout of at least one element included in the user interface to correspond to the display size.

According to an embodiment disclosed in the disclosure, a method for providing augmented reality content in an electronic device (e.g., an electronic device 101 of FIG. 1, an electronic device 201 of FIG. 2, or an electronic device 1201 of FIG. 12) may include displaying a first image captured by a camera (e.g., a camera module 180 of FIG. 1 or a camera 210 of FIG. 2) and a second image received from an external electronic device (e.g., an electronic device 104 of FIG. 1 or an external electronic device 203 of FIG. 2) through a communication circuit (e.g., a communication module 190 of FIG. 1 or a communication circuit 240 of FIG. 2) on a display (e.g., a display module 160 of FIG. 1 or a display 230 of FIG. 2), displaying first augmented reality content on the first image, displaying second augmented reality content on the second image, and displaying an animation effect of the first augmented reality content using the second augmented reality content based on a user input through a touch panel (e.g., an input module 150 of FIG. 1 or a touch panel 220 of FIG. 2).

According to an embodiment disclosed in the disclosure, the first augmented reality content may be generated based on a user input of a first user being a user of the electronic device, and the second augmented reality content may be generated based on a user input of a second user being a user of the external electronic device and may be transmitted from the external electronic device through the communication circuit.

According to an embodiment disclosed in the disclosure, the user input of the first user or the user input of the second user may include an input using a stylus pen (e.g., a stylus pen 425 of FIGS. 4A and 4B, a stylus pen 645 of FIG. 6, a stylus pen 745 of FIG. 7, a stylus pen 945 of FIG. 9, a stylus pen 1145 of FIG. 11, a stylus pen 1216 or 1226 of FIG. 12, or a stylus pen 1345 of FIG. 13).

According to an embodiment disclosed in the disclosure, the method may include identifying at least one object included in the first augmented reality content and the second augmented reality content and displaying the animation effect corresponding to the identified at least one object among animation effects specified according to objects, in response to the user input.

According to an embodiment disclosed in the disclosure, the animation effect may include at least one animation effect for the same object. The displaying of the animation effect may include displaying the animation effect corresponding to the user input among the at least one animation effect.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a camera;
a touch panel;
a display;
a communication circuit;
at least one processor operatively connected with the camera, the touch panel, the display, and the communication circuit; and
a memory operatively connected with the at least one processor,
wherein the memory stores one or more instructions, when executed, causing the at least one processor to:
display a first image captured by the camera and a second image received from an external electronic device through the communication circuit on the display,
receive a drawing input of a first user of the electronic device on the displayed first image,
display first augmented reality content obtained by the electronic device based on the drawing input of the first user of the electronic device on the displayed first image,
display second augmented reality content obtained by the external electronic device based on a drawing input of a second user of the external electronic device on the second image, and
display an animation effect of the first augmented reality content using the second augmented reality content based on a user input through the touch panel.

2. The electronic device of claim 1,
wherein the first augmented reality content is generated based on the drawing input of the first user, and
wherein the second augmented reality content is generated based on the drawing input of the second user and is transmitted from the external electronic device through the communication circuit.

3. The electronic device of claim 2, wherein the drawing input of the first user or the drawing input of the second user comprises an input using a stylus pen.

4. The electronic device of claim 1, wherein the instructions further cause the at least one processor to:
identify at least one object included in the first augmented reality content and the second augmented reality content, and
display the animation effect corresponding to the identified at least one object among animation effects specified according to objects, in response to the user input.

5. The electronic device of claim 1,
wherein the animation effect comprises at least one animation effect for the same object, and
wherein the instructions further cause the at least one processor to:
display the animation effect corresponding to the user input among the at least one animation effect.

6. The electronic device of claim 1,
wherein the first image comprises a preview image obtained by the camera, and
wherein the second image comprises a preview image obtained by a camera of the external electronic device.

7. The electronic device of claim 1, wherein the instructions further cause the at least one processor to:
identify a body part of a first user where the first augmented reality content is displayed from the first image, and
display the first augmented reality content on a body part of a second user, the body part corresponding to the body part of the first user, on the second image.

8. The electronic device of claim 7, wherein the instructions further cause the at least one processor to:
identify a body part of the second user where the second augmented reality content is displayed from the second image, and
display the second augmented reality content on a body part of the first user, the body part corresponding to the body part of the second user, on the first image.

9. The electronic device of claim 1,
wherein the instructions further cause the at least one processor to:
transmit the first augmented reality content to the external electronic device through the communication circuit.

10. The electronic device of claim 1,
wherein the camera comprises a first camera disposed towards the same direction as a direction where a display area of the display is exposed and a second camera disposed towards a direction opposite to the direction of the first camera, and
wherein the instructions further cause the at least one processor to:
display a third image captured by the first camera, a fourth image captured by the second camera, and a fifth image in which the third image and the fourth image are synthesized with each other,
display third augmented reality content on the fifth image as the third augmented reality content is displayed on the third image based on a user input through the touch panel and display fourth augmented reality content on the fifth image as the fourth augmented reality content is displayed on the fourth image based on a user input through the touch panel, and

US 12,626,432 B2

41 store the fifth image where at least one of the third augmented reality content or the fourth augmented reality content is displayed.

11. The electronic device of claim 10, wherein the instructions further cause the at least one processor to:

recognize a specified body part of a user from the third image or the fourth image, and change a location where the third augmented reality content or the fourth augmented reality content is displayed on the fifth image based on interaction using the specified body part or display an animation effect of the third augmented reality content or an animation effect of the fourth augmented reality content.

12. The electronic device of claim 1, further comprising:

a sensor, wherein the instructions further cause the at least one processor to:

detect, by the sensor, proximity of a body part of a user or a stylus pen to the display using the sensor, and activate and display a user interface for generating augmented reality content on the display based on an input using the body part of the user or the stylus pen, based on the detected result of the sensor.

13. The electronic device of claim 12, wherein the user interface comprises a color selection element and a virtual pen selection element, and wherein the instructions further cause the at least one processor to:

change at least one of a color or a line type of the augmented reality content based on a user input through the user interface.

14. The electronic device of claim 12, wherein the display comprises a flexible display, and wherein the instructions further cause the at least one processor to:

sense a change in display size using the sensor, and adjust the user interface to correspond to the display size.

15. The electronic device of claim 14, wherein the instructions further cause the at least one processor to:

change a size or layout of at least one element included in the user interface to correspond to the display size.

16. A method for providing augmented reality content, performed by an electronic device, comprises:

displaying a first image captured by a camera of the electronic device and a second image received from an external electronic device through a communication circuit of the electronic device;

receiving a drawing input of a first user of the electronic device on the displayed first image, displaying first augmented reality content obtained by the electronic device based on the drawing input of the first user of the electronic device on the displayed first image on a display of the electronic device;

displaying second augmented reality content obtained by the external electronic device based on a drawing input of a second user of the external electronic device on the second image; and displaying an animation effect of the first augmented reality content using the second augmented reality content based on a user input through a touch panel of the electronic device.

17. The method of claim 16, wherein the first augmented reality content is generated based on the drawing input of the first user, and wherein the second augmented reality content is generated based on the drawing input of the second user and is transmitted from the external electronic device through the communication circuit.

18. The method of claim 17, wherein the drawing input of the first user or the drawing input of the second user comprises an input using a stylus pen.

19. The method of claim 16, further comprising:

identifying at least one object included in the first augmented reality content and the second augmented reality content; and displaying the animation effect corresponding to the identified at least one object among animation effects specified according to objects, in response to the user input.

20. The method of claim 16, wherein the animation effect comprises at least one animation effect for the same object, and wherein the displaying of the animation effect comprises a preview image obtained by a camera of the external electronic device.

* * * * *